United States Patent
Lopes et al.

(10) Patent No.: US 11,321,578 B2
(45) Date of Patent: May 3, 2022

(54) ANALYSIS OF A CAPTURED IMAGE TO DETERMINE A TEST OUTCOME

(71) Applicant: Novarum DX Ltd

(72) Inventors: Antonio Manuel Domingos Lopes, Scotland (GB); Anthony Peter Ashbrook, Scotland (GB); Neil Polwart, Scotland (GB)

(73) Assignee: Novarum DX Ltd., Edinburgh Central (GB)

( * ) Notice: Subject to any disclaimer, the term of this patent is extended or adjusted under 35 U.S.C. 154(b) by 0 days.

(21) Appl. No.: 16/956,408

(22) PCT Filed: Dec. 19, 2018

(86) PCT No.: PCT/GB2018/053700
§ 371 (c)(1),
(2) Date: Jun. 19, 2020

(87) PCT Pub. No.: WO2019/122883
PCT Pub. Date: Jun. 27, 2019

(65) Prior Publication Data
US 2021/0089814 A1 Mar. 25, 2021

(30) Foreign Application Priority Data
Dec. 22, 2017 (GB) .................................. 1721811

(51) Int. Cl.
G06K 9/22 (2006.01)
G06K 9/62 (2022.01)
(Continued)

(52) U.S. Cl.
CPC .......... G06K 9/6206 (2013.01); G01N 21/77 (2013.01); G06K 9/22 (2013.01); G06K 9/3216 (2013.01);
(Continued)

(58) Field of Classification Search
CPC .......... G01N 21/97; G06K 9/22; G06K 9/3216
See application file for complete search history.

(56) References Cited

U.S. PATENT DOCUMENTS 6,446,120 B1 * 9/2002 Dantressangle ........ H04L 43/50
709/203
2007/0242887 A1 * 10/2007 Matsushita ........ H04N 21/4415
382/209
(Continued)

FOREIGN PATENT DOCUMENTS

WO WO2012131386 * 4/2012 ............. G01N 21/84

OTHER PUBLICATIONS

H. Liu, et al., "Partial Shape Classification Using Contour Matching in Distance Transformation", IEEE Transactions on Pattern Analysis and Machine Intelligence, vol. 12, No. 11, 8 pgs., Nov. 1, 1990.
(Continued)

Primary Examiner — Myron Wyche
(74) Attorney, Agent, or Firm — Banner Witcoff, Ltd.

(57) ABSTRACT

An acquired image is analysed to determine a test outcome value. A shape template for a test structure is provided to identify a position of a target measurement region on the test structure. A mapping defining a transformation of the shape template onto the image frame is determined. A mapping is determined and it is determined if a first matching condition based on first displacements of one or more edges identified in the image frame relative to the shape template is satisfied for the mapping. When the mapping satisfies the first matching condition and a second different matching condition based on second displacements of one or more edges identified in the image frame relative to the shape template, a verified image of a test structure is established. In the verified image of the test structure a target measurement
(Continued)

region is identified. A test outcome value is determined by analysing the target measurement region.

18 Claims, 15 Drawing Sheets

(51) Int. Cl.
    *G01N 21/77*     (2006.01)
    *G06K 9/32*     (2006.01)

(52) U.S. Cl.
    CPC .......... *G06K 9/6211* (2013.01); *G06K 9/6262* (2013.01); *G06K 2209/05* (2013.01)

(56) References Cited

U.S. PATENT DOCUMENTS

| | | |
|---|---|---|
| 2011/0085716 A1 | 4/2011 | Chefd'hotel et al. |
| 2012/0140993 A1* | 6/2012 | Bruso ............... G06K 9/00899 382/118 |
| 2012/0163687 A1 | 6/2012 | Plakas et al. |
| 2013/0005048 A1* | 1/2013 | Felten ................ C09B 67/0041 436/164 |
| 2013/0201291 A1* | 8/2013 | Liu .......................... G06T 7/74 348/47 |
| 2014/0079338 A1* | 3/2014 | Siewerdsen ........... G06T 7/0012 382/284 |
| 2014/0154789 A1 | 6/2014 | Polwart et al. |
| 2016/0328591 A1* | 11/2016 | Santi .................... G06K 7/1408 |
| 2017/0083788 A1* | 3/2017 | Chan ................... G06K 9/6267 |
| 2019/0102868 A1* | 4/2019 | Beric .................... G06T 3/0018 |

OTHER PUBLICATIONS

A. Jain, et al., "Object Matching Using Deformable Templates", IEEE Transactions on Pattern Analysis and Machine Intelligence, vol. 18, No. 3, 15 pgs., Mar. 1, 1996.

* cited by examiner

ANALYSIS OF A CAPTURED IMAGE TO DETERMINE A TEST OUTCOME

TECHNICAL FIELD

Embodiments described herein generally relate to analysing an image to determine a test outcome. More particularly, although not exclusively, embodiments relate to identifying a target measurement region in an image frame to perform an analysis to determine the test outcome.

BACKGROUND

Mobile devices such as mobile phones have cameras that can be used to capture and process images of good quality in a way that is convenient for a user. However, captured images of a given object may vary considerably depending upon the skill of the photographer, lighting conditions, zoom level and camera angle, for example. Image processing techniques can be used to identify particular objects in an image to varying degrees of accuracy.

Image objects may be identified using edge detection algorithms to identify edge pixels in an image and to connect up adjacent edge pixels having similar orientations (e.g. based on a brightness gradient) to form a line. To detect shapes, different subsets of detected lines may be tested sequentially to determine if a given shape such as a rectangle is present in an image. This process can be computationally inefficient. Algorithmic analysis of digital images may be more reliable than the human eye in detecting subtle variations in luminosity and colour and by providing quantitative rather than qualitative results. One or more algorithms may be used to encode test outcome rules for a given test to reduce the burden of test outcome interpretation on a human being. Examples of tests for which image processing could provide improved precision include, but are not limited to, chemical, biochemical and microbiological assays which are based on development of a colour change in a defined area of a test structure over a time interval. Other examples include testing for colour variations in human skin that may be associated with skin cancer or raised bilirubin levels.

BRIEF DESCRIPTION OF THE DRAWINGS

Embodiments of the invention are further described hereinafter with reference to the accompanying drawings, in which.

DETAILED DESCRIPTION

The present technique relates to a system for determining a test outcome from a test structure using a mobile device, by analysing a captured image. The test structure may be for example any test measurement device with a visual element that changes depending on the measurement taken. A user may use a mobile device to capture an image of the test structure and the present technique may analyse the image to provide the user with a test outcome value. The test structure may be recognised and tracked in real time. A shape template may be used on the image frame where the shape template defines one or more target measurement regions that can be extracted from an acquired image frame and processed. An improved test outcome value may be determined by capturing and processing multiple target measurement regions.

Figure 1B:
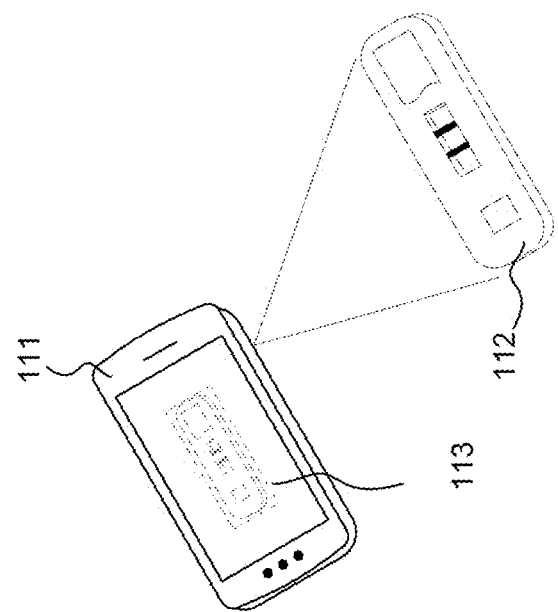
FIG. 1b schematically illustrates a mobile device executing a program application to determine a test outcome value of the test structure.
Figure 1A:
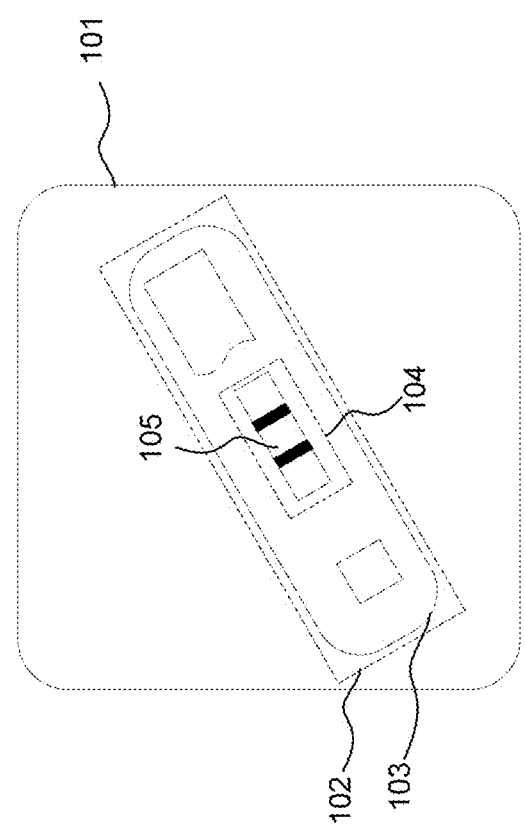
FIG. 1a schematically illustrates an image frame with a shape template in an image frame around a test structure.

FIG. 1a schematically illustrates an image frame 101 with a shape template 102 in the image frame 101 around a test structure 103 having a test result displaying area 105 corresponding to a target measurement area 104.

Figure 6:
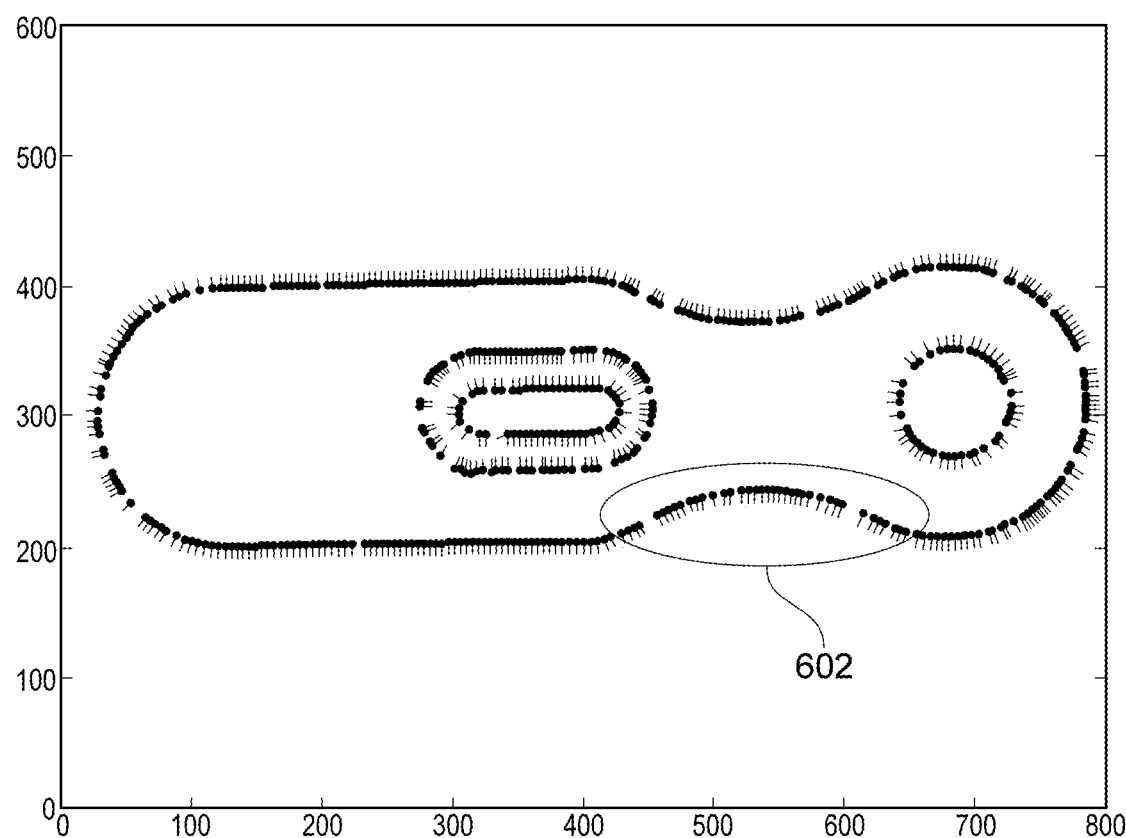
FIG. 6 schematically illustrates a shape template with normal vectors at each point on the shape template.

The test structure 103 may be any object used to establish a test outcome value which the user may wish to know or analyse. The test structure may be any form of measurement device, for example, the test structure may be: a chemical or biological assay; a device for testing the presence of or concentration of a chemical or biological substance; a material which is sensitive to the atmosphere, temperature or time resulting in a visible change; a sampling device where some or all of device undergoes a colour change in the presence or absence of a substance; any receptacle into or onto which a test sample may be placed to obtain a colour change in the presence or absence of a substance or a reference scale placed alongside or surrounding a region of interest. A time series of captured images may be used to detect a progressive colour change. The test structure 103 is not limited to a structure for performing chemical or biological tests. In some examples, the test structure may be a moulded plastic structure for performing a chemical or biological test. Alternatively, the test structure may be a housing made from a non-plastics material such as, for example, cardboard or a paper-style test substrate or the like. In yet further examples, the test structure may be a human or an animal body part such as a region of skin. In further alternative examples the test structure may be a different category of device from which a reading may be taken such as a meter displaying a measurement such as a pH meter, thermometer, glucometer, gas meter or an electric meter. In the example of FIG. 1a, the shape template 102 is rectangular to roughly correspond to the shape of the test structure 103. The shape template 102 may be any shape and may correspond to the shape of any test structure 103 or at least some features of the test structure useful for determining a test outcome value from a target measurement region. The shape template may be an outline which is of a size and shape corresponding to a test structure. The shape template may also include information which indicates a position within the shape template where the target measurement region of the test structure may be. Alternatively, the shape template may be a shape and size corresponding to an outline of the target measurement region on the test structure and may thus correspond to a predetermined portion of the test structure. The shape template may be a collection of 2D points that correspond to the visible outline of the test structure. The 2D points may be a set of points in a coordinate frame to the shape template. The coordinate frame of the shape template may differ from a coordinate frame of a captured image. For example, there may be a difference in at least one of scale and orientation of the shape template coordinate frame and the image coordinate frame. The 2D points may also record a direction of at least some points on the outline of the test structure at the point, such as a direction normal to an edge and extending away from the test structure. One example of such direction information is illustrated in FIG. 6.

In some examples, the shape template 102 may be displayed on an image viewer prior to capture of the image. In some such examples, the image frame 101 may be captured such that the test structure 103 is inside the outline of the shape template 102. Should the image frame 101 be determined to be a verified image frame of the test structure 103 then the shape template 102 may be used to identify a target measurement region 104 corresponding to the area test result displaying area 105. A verified image frame is one for which two different matching conditions have been satisfied between the image frame and the shape template, which will be described in detail with reference to FIG. 2 below. The target measurement region 104 of the verified image may then be analysed to determine a test outcome. For example, the test structure 103 may be a diagnostic test having a medical application and a test result displaying area 105 may be a paper-type material or other test substrate which displays a number of lines (as in a pregnancy test) or a reaction colour for matching against a reference chart (as in a urine test for glucose or ketones) based on the result of the diagnostic test. Alternatively, the test structure may provide a target measurement region corresponding to a window for placing on human skin to perform a bilirubin level test or a skin cancer test. The target measurement region 104 of the example of FIG. 1a and FIG. 1b which includes the screen with lines in the test result displaying area 105 representing a pregnancy test result may be analysed to determine a test outcome.

FIG. 1b schematically illustrates an image capture apparatus such as a mobile device 111 executing a computer program application to determine the test outcome value of the test structure 112.

The mobile device 111 may be, for example, a mobile phone, a laptop, a tablet, a smart phone, a wearable device such as a watch or glasses or any other suitable portable electronic device, but could be any electronic device capable of image capture.

The mobile device 111 has been positioned such that the integral camera may acquire an image frame 101 including an image of the test structure 112. This image frame 101 or at least a part of the image frame such as processed edges may be displayed on a display unit of the mobile device 111 as illustrated.

The display unit of the mobile device may be a touchscreen, an LCD screen or any suitable display unit. In some examples, the display may be transparent and the test structure may be visible through it.

The mobile device 111 may also display a guide 113 on the image frame 101 to represent the shape template 102 and to assist the user when aligning the mobile device 111 to capture the image. In alternative examples, the shape template guide is not displayed on the screen. The user may be notified that the image frame 101 (see FIG. 1a), which may be appearing on the display unit, is a verified image of the test structure 112. The verified image may be stored in memory on the mobile device prior to verification or after verification as a suitable image from which to determine a test outcome value. The captured image may be analysed to determine a test outcome value.

An image frame may be captured and stored in memory before the image is determined to be a verified image of the test structure and the captured image frame may subsequently be discarded if it was found not be a verified image of the test structure.

Figure 2:
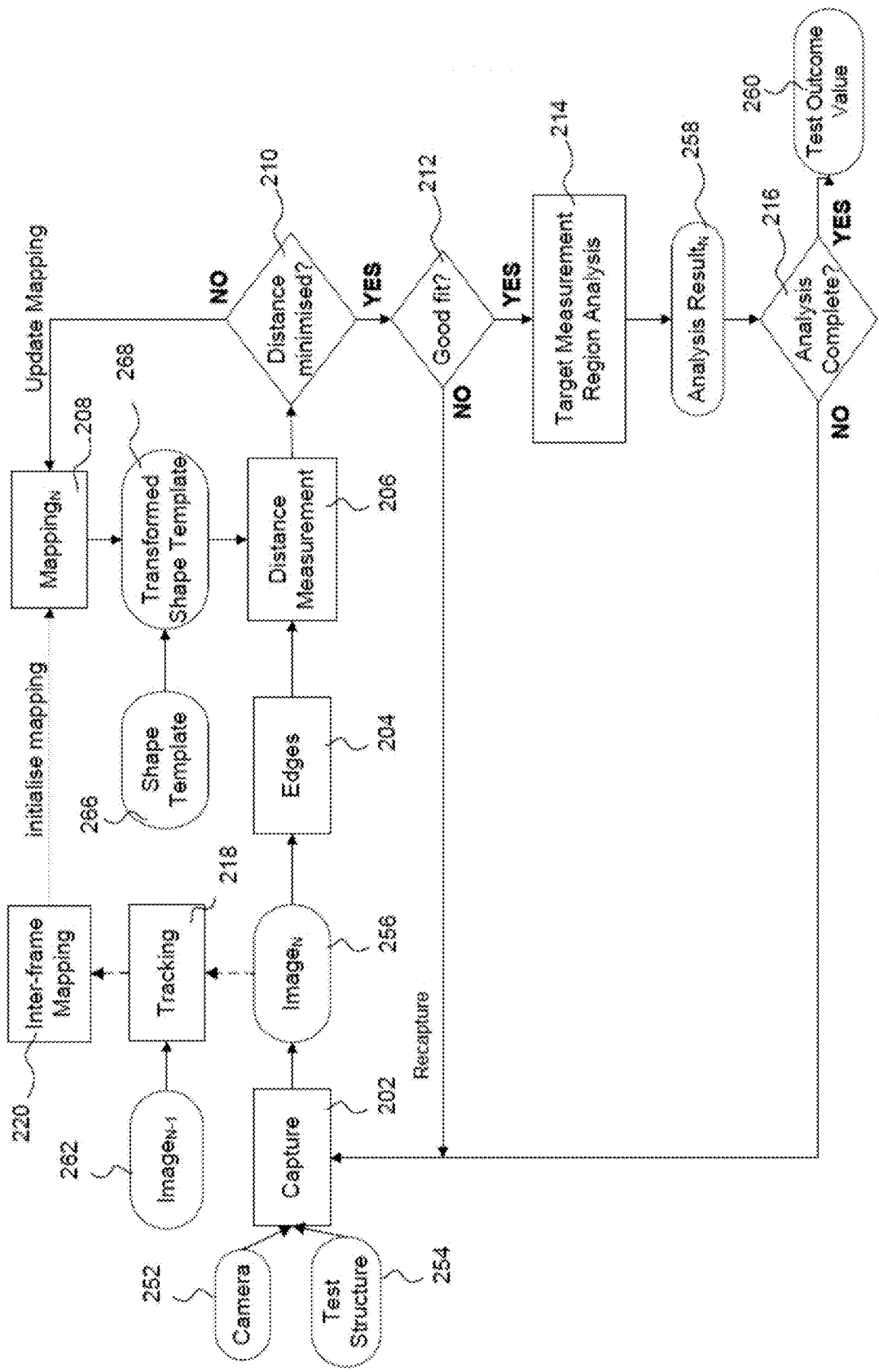
FIG. 2 is a flow chart schematically illustrating a system for determining a test outcome value from the test structure.

A test outcome value may be displayed on the display unit of the mobile device 111 or may be supplied to a user of the mobile device via some other mechanism such as via an email or a text message. The test outcome value may be supplied to one or more remote devices as well as or instead of being supplied to the user of the mobile device. Multiple image frames may be captured of the same test structure, for example in a successive time series, by the mobile device 111 and a result may be determined by combining different test outcome values from the multiple image frames. This may allow an even more accurate test result to be determined with a higher level of confidence statistically. FIG. 2 is a flow chart schematically illustrating a system for determining a test outcome value from a test structure.

At element 202 an image frame of a test structure may captured using a camera 252 of the mobile device 111 (see FIG. 1b). Alternatively, the image frame may be acquired by accessing an image stored in memory of the mobile device or external memory which may be remotely accessed by the mobile device. The image frame may be captured in response to an indication that a test outcome value is requested, for example, by a user activating an image capture button on a touch screen of a mobile device or a physical button. Alternatively, a test outcome determining application according to the present technique may automatically capture an image of the test structure based on detection of the test structure in the imaging field of view when the application has been activated.

An image captured in the N-th cycle of the method may be referred to as Image$_N$ 256, where N is a non-zero integer. Acquired images of the test structure may vary depending upon, for example, a level of ambient light, a camera angle, a distance of the camera from the test structure and depending upon relative motion between the camera and the test structure at the time of image capture. To compensate for the variability in quality of different acquired images of the test structure, a correction such as at least one of a colour correction or a camera distortion correction may be performed prior to identifying the test structure in the image. An optical flow tracker algorithm may be used to perform one or more of these corrections. The image frame captured or acquired may include an image of a test structure 254 from which a test outcome is to be determined via the program application. The test structure 254 may be any of the test structures described above with respect to test structure 103.

The method may be conveniently adapted to work for different pre-existing test structure designs by providing an appropriate shape template to enable identification in the image of the target test structure from which a test outcome is to be determined.

From $Image_N$ 256 there are two alternative routes the method of this example may take depending on whether or not image tracking is optionally used to perform a mapping between the shape template and the image frame, making use of previously capture images to more easily determine an appropriate mapping between the shape template and the $Image_N$ 256. In a first route, no previous images are used to perform tracking of the shape template and the process proceeds sequentially from $Image_N$ 256 to an edge detection element 204, then to a distance measurement element 206 followed by a distance minimisation process element 210. In the first route, the mapping element 208 and the shape template element 266 are also used to perform at shape template transformation at element 268, which may be used as one input to the distance measurement element 206, to form a comparison with edges detected in the captured image frame at element 204.

As can be seen from FIG. 2, mapping element 208, denoted $Mapping_N$, may be updated in a number of iterations. Initially $Mapping_N$ is set to $Mapping_{N-1}$, where $Mapping_{N-1}$ is the final value of the mapping determined for a previous image, $Image_{N-1}$. The rationale is that the position of the test structure 254 in $Image_N$ is likely to be similar to the position of the test structure in $Image_{N-1}$, therefore $Mapping_{N-1}$ can conveniently provide a good initial approximation for $Mapping_N$. This improves the efficiency of the mapping process.

The second route, originating from $Image_N$ 256 involves the optional image tracking element 218, which receives previously captured images of the same test structure and performs an inter-frame mapping at element 220, which may be used to initialise $mapping_N$ at element 208. So at process element 220 $mapping_N$ is initialised to $mapping_N$ x Inter-Frame Mapping, where Interframe Mapping 220 is the mapping from $Image_{N-1}$ to $Image_N$ determined by the Tracking 218. Following the first route at element 204, the $Image_N$ 256 is processed to find one or more edges in the image frame. The edges may be determined using an edge detection algorithm for example, a "Canny" edge detection algorithm. Although any edge detection algorithm may be used. An edge detection algorithm may measure the brightness gradient at least one of vertically and horizontally at each pixel in the image frame corresponding to $Image_N$ 256. If the magnitude of the brightness gradient of the pixel is greater than or greater than or equal to a pre-determined value, the pixel may be defined as an edge of the captured image frame. The direction of the edge may be defined as the direction of a determined brightness gradient. The edge may correspond, for example, to at least one of a part of the outline of the test structure in the image frame, any distinctive features on the test structure such as the target measurement region 105 in the FIG. 1a example or registration marks on the test structure.

Figure 3:
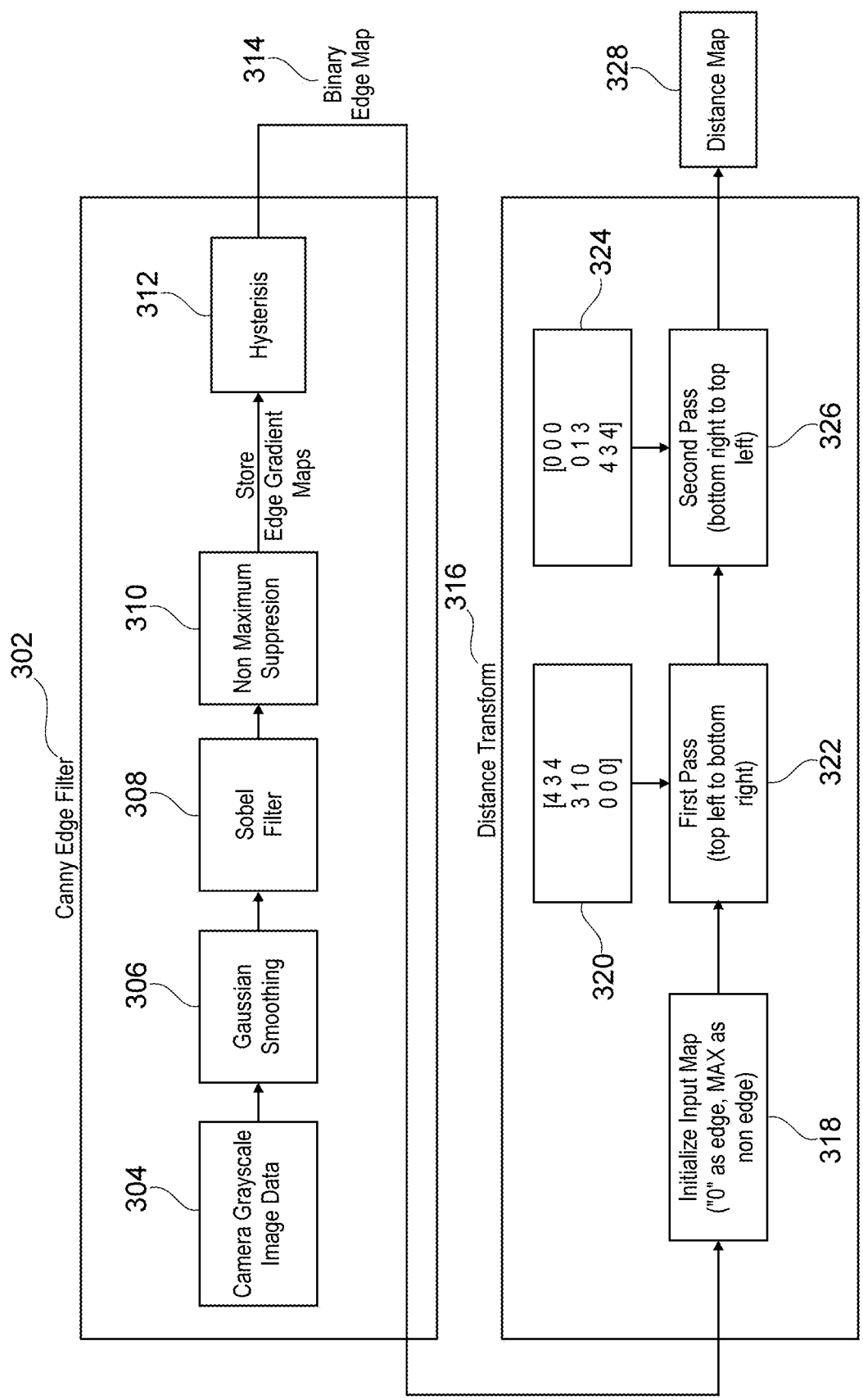
FIG. 3 is a flow chart schematically illustrating a method for detecting edges in an image frame including edge detection and a distance transform.

The process of determining edges at process element 204 in the image frame using, for example, Canny Edge Detection may be performed using the Canny Edge Filter as illustrated in FIG. 3. Considering now the FIG. 3 edge detection process, at element 304, the image frame, which is captured in colour (not illustrated) in this example, may be converted into greyscale image data. At element 306, Gaussian Smoothing may be performed and a gaussian filter may be applied to the greyscale image. This may remove at least some of the noise from the image. At element 308, a Sobel filter, or any other suitable mechanism may be used to find intensity gradients in the smoothed, grayscale image. At item 310, the edges in the image may be further defined by applying non-maximum suppression which may remove edges that may have been falsely detected. Any similar mechanism may be used to remove falsely detected edges. These images may then be stored in memory or a buffer in the form of edge gradient maps. At element 312, the detection of edges may be finalised by tracking the edges using hysteresis. The hysteresis may suppress the potential edges that are not connected to strong edges. This may result in a final binary edge map at element 314 of the processed image defining where the edges have been detected in the image.

The binary edge map may then be further processed using a Distance Transform 316. The distance transform 316 may be for example, based on a two-pass 3×3 kernel pass implementation by Azreil Rosenfeld and John L. Pfaltz. At element 318 the distance transform may initialise an input map. The input map may define "0" as an edge and "MAX" as a non-edge. The input map may be a binary type map where "0" is an edge point and "1" is not an edge point. An example input map is shown at element 320. This may be passed through element 322 in which a first pass is performed and the components of the map may be transformed from top left to bottom right. This may result in the map of element 324. The map is then passed through a second pass at element 326 in which the components of the map may be transformed from bottom right to top left. The transform may output a value map where values are small close to edges and further from the edges values are higher. The value map may be a distance map 328. The value map may be a "city block distance map". In a city block distance map the distance may be calculated as the distance along the x axis plus the distance along the y axis.

Returning to the FIG. 2 process and, in particular, the first route where tracking is not performed, following the edge detection at process element 204, the distance measurement element 206 receives input from a mapping between a model of a shape template 266 and an initial mapping, $mapping_N$, at process element 208. At element 208 the mapping, $Mapping_N$, is performed between a shape template 266 and the captured image frame, $Image_N$ 256.

Figure 4:
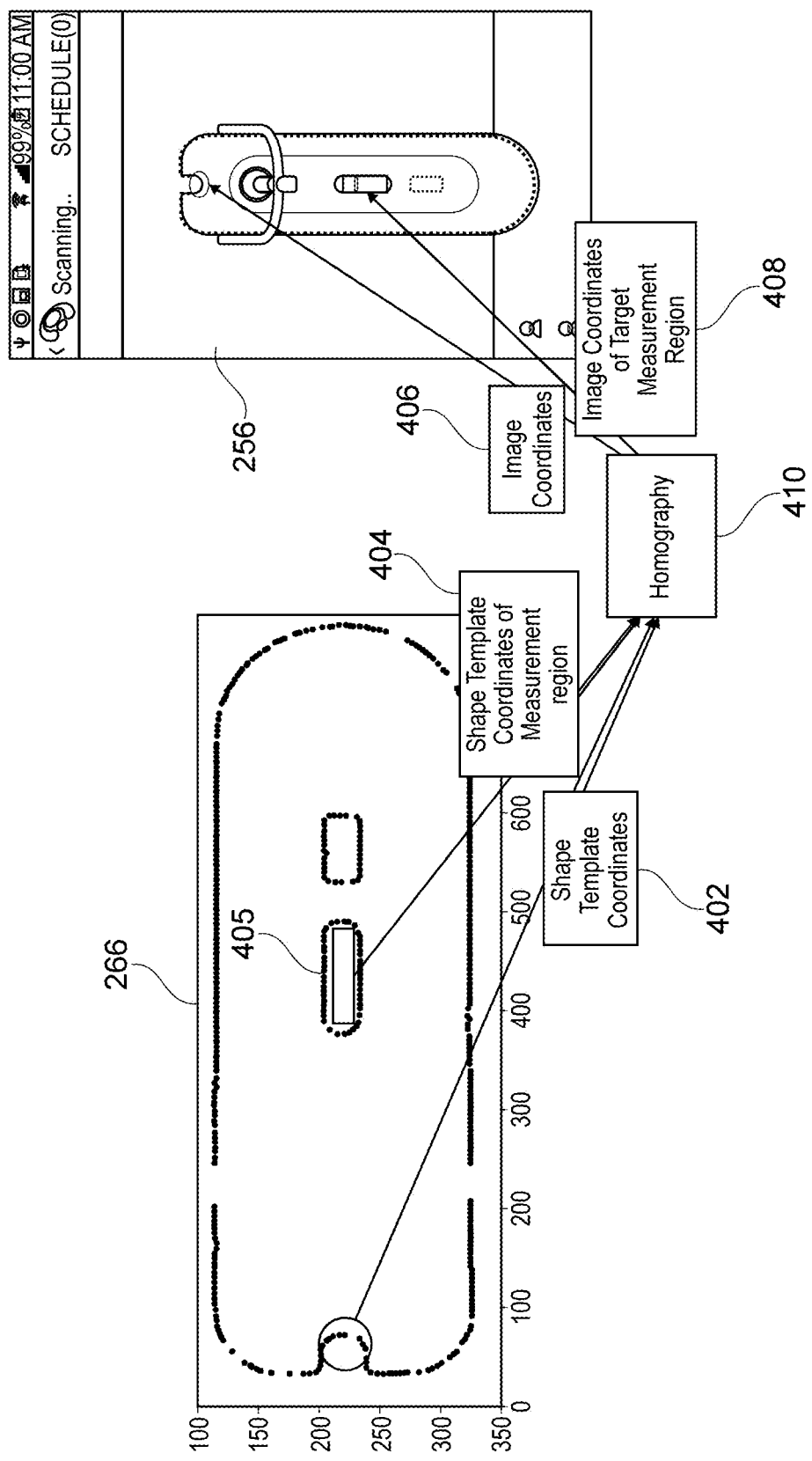
FIG. 4 schematically illustrates a mapping of shape template coordinates into image coordinates.

FIG. 4 schematically illustrates an example of this mapping step. The $Mapping_N$ may include transforming the shape template coordinates 402 of the shape model into image coordinates 406 corresponding, for example, to pixel locations on a captured image frame. The mapping may comprise at least one of change of scale and a rotation of the shape template 266 (shown on FIG. 4) to map it onto the $Image_N$ 256.

The shape template 266 may be predetermined and may be stored in memory on the mobile device 111 or in external memory that can be accessed remotely by the mobile device. The shape template 266 may be an outline which is of a size and shape corresponding to a test structure as shown. The shape template 266 may correspond to a subset of features of the actual test structure, corresponding to the most important features to determine a mapping and to identify a target measurement region 405 for determining a test outcome. For example, if the test structure is approximately rectangular in shape, the shape template may be rectangular. The shape template 266 may be a collection of 2D points that correspond to the visible outline of the test structure. The 2D points may record the position of the point in a specific coordinate frame to the shape template. The 2D points may also record the direction of the outline of the test structure at the point as illustrated in FIG. 6. At least a subset of these 2D points may be defined as the shape template coordinates 402.

The shape template 266 may provide a reference to identify the position of the target measurement region 405 on the test structure such as a windowon the test structure where a test result will be displayed. The target measurement region 405 may be defined in the shape template as a set of shape template coordinates 404 of the target measurement region 405. The target measurement region 405 is not limited to a window displaying test lines from a chemical reaction, but instead may be, for example, a window framing a region for analysis such as a frame for a user to place on a mole or skin lesion for analysis. The target measurement region 405 may be a display screen arranged to display a digital test outcome in alphanumeric form, an area of the test structure which changes colour or intensity based on the measurement, or an analogue scale on the test structure displaying a measurement.

The Mapping$_N$ at element 208 involves the shape template 266 being placed on the image frame 256 in some initial position and the shape template 266 may be aligned to the outline of the test structure in the image frame 256 in some way, for example in the centre of the image frame on the assumption that the user may naturally capture the image with the test structure at or close to the screen centre. The Mapping$_N$ 208 of the shape template to the image frame may include transforming at least a subset of the coordinates on the shape template 402, 404 into corresponding image coordinates 406, 408 (e.g. pixel positions) in the image frame mapping to give a transformed shaped template 268 (FIG. 2 process element). The shape template coordinates 404 of the target measurement region 405 may be transformed into image coordinates of the target measurement region 408. This transformation into image coordinates may be a homography 410. A homography may be a matrix (for example a 3×3 homogenous matrix) that maps 2D points on an object plane onto 2D points of the image plane of a projective camera viewing the object plane. The object plane in this example may be considered the plane of the shape template.

The initial mapping at process element 208 in FIG. 2 may be performed by positioning the shape template in the centre of the image frame. The shape template may be automatically positioned in the centre of the image frame. Alternatively, or in addition, a guide representing the shape template may be displayed on a display screen of the mobile device to assist the user when positioning the camera when acquiring the image frame. The displayed shape template guide may assist the user in assessing an appropriate zoom level at which to capture an image and an appropriate position with which to line up the test structure on the display screen to capture the image.

Alternatively, a guide corresponding to the shape template may be displayed over a captured image and the user may be able to move the guide using an input method. For example, using a touch screen the user may drag and drop a guide corresponding to a shape template representation to coincide with a test structure object in the image frame.

In a further alternative, the position of the shape template relative to an image frame may be predetermined for a respective shape template or test structure. The position of the shape template may be based on a previous attempt to identify a test measurement region in the image frame. Alternatively, the position of the shape template may be determined based on a previous outcome from a previous image frame taking into account the movement of at least one of the user or the test structure, similar to tracking of an image object using motion vectors in Moving Picture Experts Group (MPEG) video frames. In this scenario, the method may follow the alternate (second) route through optional process elements 218 and 220. At element 218 the tracking may be performed on Image$_N$ 256. This tracking may be performed using at least one previous image Image$_{N-1}$ 262, for example, a preceding image in a time series of captured images of the same test structure in the same setting. From the previous image, it may be possible to estimate the position of the outline of the test structure in the current image frame, Image$_N$ 256 by prediction a next position based on one or more previously detected mappings.

Where a plurality of images has been acquired in a time series, an optical flow tracker algorithm such as a "Lukas Kanade" algorithm may be used to correct the homography via the tracking process in the second branch of the process following branch elements 218, 220 and 208 in FIG. 2. The "Lukas Kanade" optical flow tracker may rely on an assumption that the optical flow is constant between the edges detected on the previous frame. Using the detected edges in the new frame and the detected edges in the previous frame a homography between the points in successive image frames may be calculated and this may provide a corrected position of the shape template on the image frame.

For both the first route via the edges process element 204 and incorporating the mapping process of elements 208, 266 and 268 and the second route, via the tracking element 218 and inter-frame mapping element 220, the process arrives at the distance measurement element 206. At element 206 inputs to the distance measurement process element 206 comprise results of the edge detection 204 in the captured image frame and a mapping defining a transformation of the shape template relative to the image frame as output by the transformed shape template element 268. At process element 206, a distance measurement may be performed to determine a distance between at least a subset of points on the mapped shape template and at least a non-zero subset of the detected edges in the image frame. These distances may correspond to "first displacements" of one or more edges identified in the image frame relative to the shape template.

Figure 5:
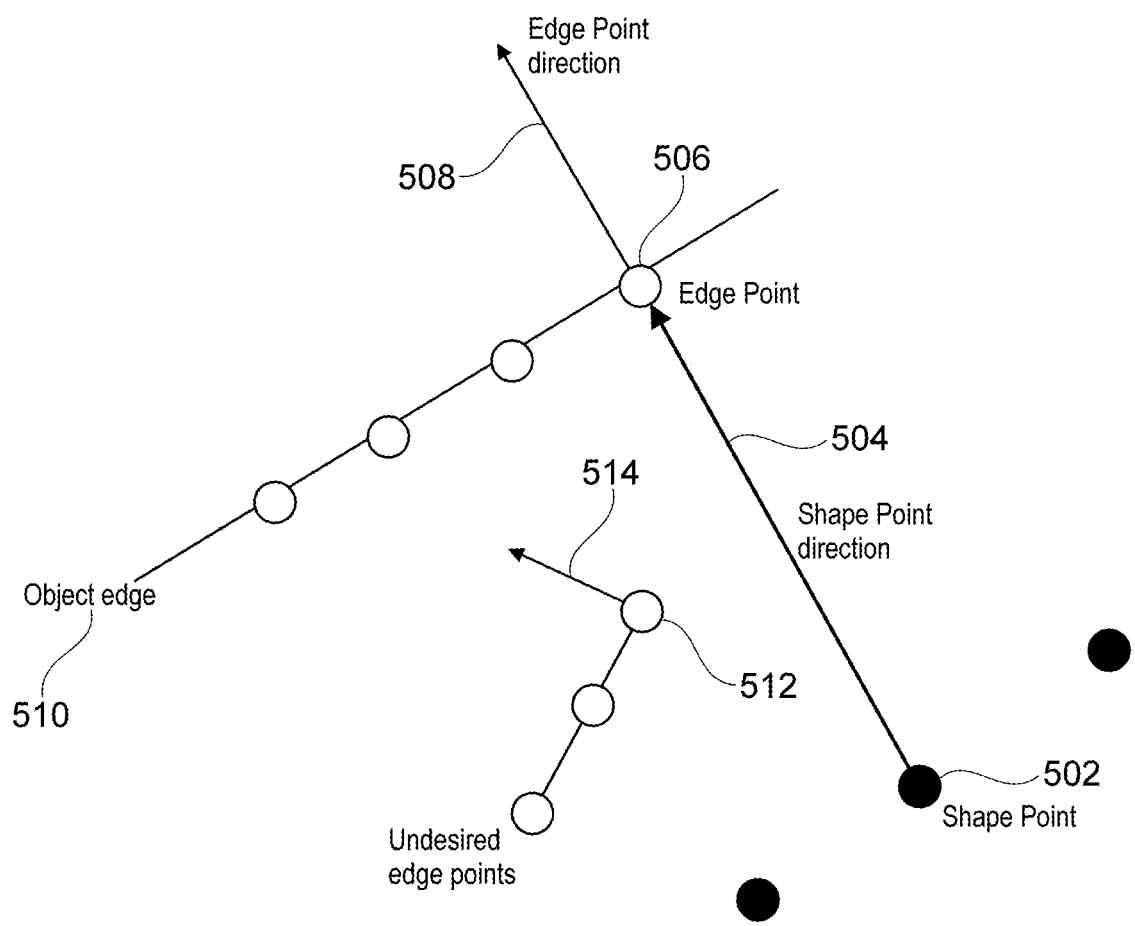
FIG. 5 schematically illustrates measuring displacements between a shape point on a shape template and an edge point on the detected outline of a test structure.

FIG. 5 schematically illustrates one example of determining of a distance 504 between a shape point 502 corresponding to at least one of the subset of points on the mapped shape template and an edge point 506 corresponding to at least one of the detected edges of the test structure in the captured image frame. This distance may be considered an example of at least one of a first displacement or a second displacement for a given point on the shape template and for a given mapping. The first displacement may correspond to a least squares fit whereas the second displacement is illustrated in FIG. 5.

One approach to determine a displacement (either a first displacement or a second displacement or both) may be to measure a shortest distance from the shape point 502 to the nearest edge point, irrespective of the orientation of the edge. This displacement may be calculated efficiently by processing the image frame with edges to obtain a distance transform. For a given mapping, the displacement may be measured for multiple different shape points 502 on the shape template and multiple detected edges in the image frame. However, in some cases using the shortest displacement can result in a point on the shape template being associated with the wrong point in the image frame. For example, as illustrated in FIG. 5, if the shortest distance between the shape point 502 and an edge point was measured, the distance between the shape point 502 and an undesired edge point 512, which does not correspond to a test structure edge in the image, may be measured. This distance between point 502 and point 512 may be the shortest, but it is clear that a group of three image points including the point 512 is not a good match for the orientation of the edge defined by the three illustrated points belonging to the shape template including the shape point 502.

An alternative approach to determining the displacement for a given shape template point may be to determine a distance from the shape point 502 of the shape template to the closest edge point 506 along a line that is tangential, or normal, to the direction of the edge of the shape template as indicated by a shape point vector 504 in FIG. 5. The shape point vector 502, which may be a normal to the edge of the shape formed by the group of three shape template points may be defined as part of the shape template as shown in FIG. 6. A magnitude of the shape point vector 504 may corresponds to the first displacement or the second displacement (or both displacements for a given transformed shape template point) in this example. If the shape point vector 504 is in the same direction as an edge point direction vector 508 then the edge point 506 in the captured image is likely to be a good match for the shape point 502 of the shape template. Measuring the first displacements between shape points of the shape template and corresponding edge points detected in the captured image frame in this way, although more complex than determining a closest point in any direction, may be more efficient overall by making it more likely that a point on the mapped shape template is associated with the correct edge point in the image frame. The first displacement or the second displacement may be measured for multiple shape points 502 on the shape template and for multiple edge points 506 on the object edge 510. Incorporating a larger number of points in the matching process may increase an accuracy of a given mapping based on the first displacements.

Returning to the flow chart of FIG. 2, at distance minimisation process element 210 it may be decided if the sum of the first displacements or some other mathematical combination of first displacements is minimised for a current mapping defining the transformation of the shape template relative to the image frame. A mathematical algorithm such as a minimisation algorithm may be applied to the first displacements or to a sum or other mathematical combination of the first displacements to determine how similar the position and/or orientation of the shape template is to the position and/or orientation of the edges detected in the captured image frame. The minimisation algorithm may be a minimum least-squares fit algorithm, for example a Levenberg-Marquardt algorithm. If it is determined that the mean square of the first displacements is not minimised at process element 210 then the process performs a further iteration of mapping such that mapping element 208 may be performed again to change the mapping of the shape template on the captured image frame. Each iterative mapping may be based on the previous mapping, to update the mapping until the mean square of the first displacements is found to be minimised or to meet an alternative matching condition. The mean square of the first displacements may be found to be minimised when mean square of the first displacements cannot be reduced any further by performing further iterations of updating the mapping.

When the mean square of the first displacements is minimised or otherwise matched, it is expected that the mapped shape template may be roughly aligned with the edges in the image frame if both are visually displayed on the same screen.

Figure 7:
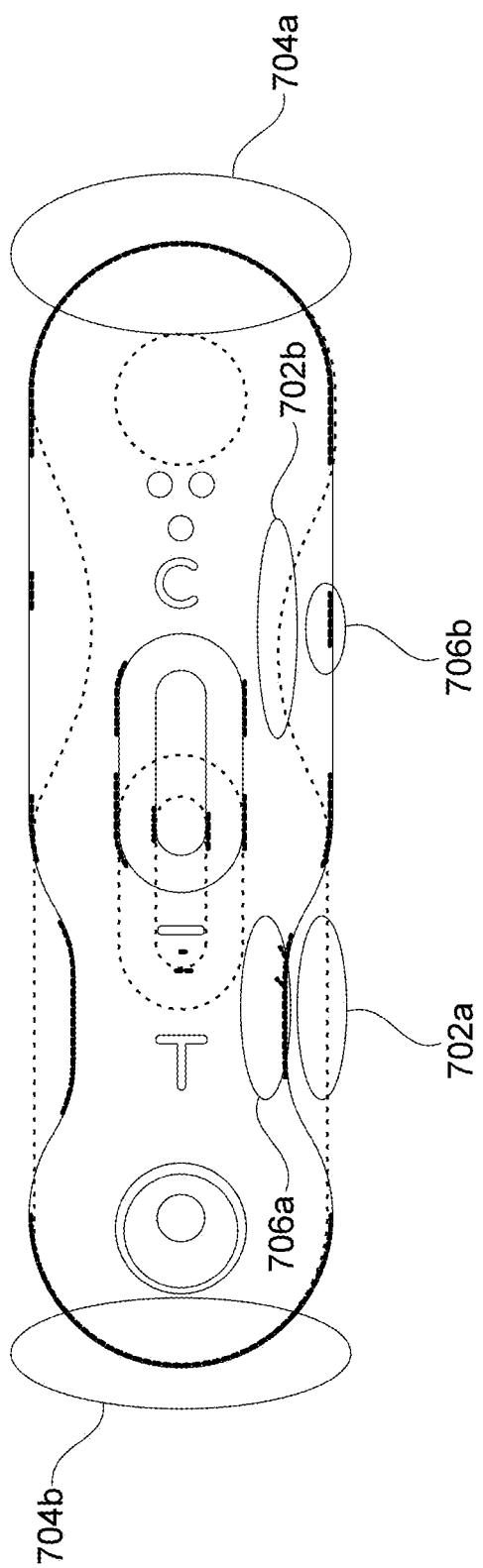
FIG. 7 schematically illustrates an example when the shape template fits algorithmically to an image of the test structure in an incorrect orientation.

After the distance minimisation at process element 210, the process proceeds to element 212 where a test may be performed to determine if the mapped shape template is sufficiently well aligned with the image of the test structure. Although a given mapping may be determined to be a good fit based on the first matching condition on account of some edges matching well between the shape template and the test structure, the match may be coincidental. For example, as shown in FIG. 7, although some image edges may match well with shape template points at extreme ends of the test structure resulting in a first matching condition being satisfied, the mapping may be incorrect overall due to being effectively upside down. Similarly, anomalies in the first match may occur due to, for example, one or more edges of the test structure in the captured image being obscured by another object or being masked by particular lighting conditions. This process performed at element 212 may be considered a "conforming test" in which it may be determined if the shape template is a good fit or conforming to the image of the shape template. The shape template may be required to have a good fit to the image of the test structure to ensure a final test outcome value can be determined.

To implement the conforming test, second displacements may be measured between at least a subset of points on the mapped shape template and the identified edges of the image frame. These second displacements may be the same as the first displacements or alternatively may be different from the first displacements previously measured. The first displacements may correspond to a first set of points on the shape template and the second set of displacements may correspond to a second set of points on the shape template. The first set of points and the second set of points may at least partially overlap. For example, the second set of points may be a subset of the first set of points and may comprise a subset of the first set of points associated with edges of the shape template for which a close match (small displacement) is more important relative to the other points. Similarly, there may be a partial or complete overlap between the set of first displacements and the set of second displacements. The second displacements may be measured with respect to different or the same points on the mapped shape template and different or the same edges as the first displacements. The second displacements may be measured along a normal, or tangential, to the edge, using a similar method as described with respect to FIG. 5 to determine the first displacements. In alternative examples, a technique for identifying a point of the identified images edges matching a given point on the on the shape template may differ when determining the first displacement may differ from the technique performed for the purpose of measuring the second displacements.

A significance value (or weighting) may be given to each second displacement of a point of the shape template depending on the location of the point on the shape template. For example, in FIG. 6, a region 602 may be considered a region of higher significance than the longer straight edges due to the curved shape of the test structure at that portion being a good indicator that the mapping is in the correct orientation. If there was not good conformity between shape template points and edges detected in the captured image in this region for a given mapping then it may be more likely that the shape template may be positioned in the wrong orientation or location.

For example, in FIG. 7, the shape template (shown by the line with relatively thin short dashes including regions 702a and 702b is 180° out of alignment with the image of the test structure. In this example, edges detected in the captured image by the edge detection algorithm are illustrated by thicker short dashes than those used for the shape template and these include regions 706a, 706b and 704a and 704b. The end edges, for example in region 704a and 704b, of the test structure conform correctly with the points of the shape template, with short distances between matched pairs of points. However, the points on the straight section of the shape template in region 702a clearly do not conform with the curved detected edges in the captured image at 706a of the test structure at this location. Similarly, the points captured by the edge detection algorithm in area 706b correspond to a straight edge whereas the shape template points 702b closest to those detected edges correspond to a curved section. In the region 706a, the edges in the captured image are curved whereas the shape template for the illustrated mapping is straight at 702a. Conversely at 702b, the shape template has a curved edge whereas the detected image edge 706b has just a few sparse points corresponding to a straight edge. The second displacements measured at these curved edges of the shape template (or on the image of the test structure) may be given a higher significance value when considering if the shape template is a good fit or not. This example of FIG. 7, describes the curved edges as detected at region 706a of the captured image as being significant, however the present technique is not in any way limited in this respect.

Different significance values may be given to second displacements at various shape template points in any region of interest on the image of the test structure or any region which is characteristic for that particular test structure. This may, for example, be an extension on one side of the test structure, an inlet on the shape template, the test target measurement region itself or any other characteristic of the test structure. The significance values may be pre-determined based on information stored in the repository relating to the shape template.

In one example embodiment, at least one of three different approaches may be used to determine if there is a "good fit" between a transformed shape template and an object in the image frame for a given mapping using the second displacements, but the present technique is not limited to these three example approaches. These three different approaches may be considered three different examples of second matching conditions.

Second Matching Condition: Approach One

The second matching condition may be that the mean square of the second displacements, determined for example using a minimisation algorithm such as a least squares algorithm, is below a threshold, rather than the different condition of the sum of displacements being at a minimum. The mean square of the second displacements may include all of the measured displacements. Alternatively, the mean square of the displacements may include a subset of the measured second displacements based on their corresponding significance value. Alternatively, or additionally, the mean square of the second displacements may include a mean square of the second displacements based on a weighting of at least a subset of the measured second displacements, where the weighting of the second displacements is based on the determined significance value of the respective second displacement.

If the mean square of the second displacements, using any of these methods, is below a given threshold, then the mapped shape template may be considered to have a good fit and the second matching condition may be considered to be satisfied. The threshold may be configurable by a user. If the second matching condition is found to be satisfied then the mapping between the image frame detected edges and the transformed shape template may be considered to be a verified mapping of the shape template relative to the image frame. The verified mapping is likely to have a proper alignment as well as a good match via the first matching condition in terms of short distances between pairs of points in the captured image and the shape template.

Second Matching Condition: Approach Two

Figure 8:
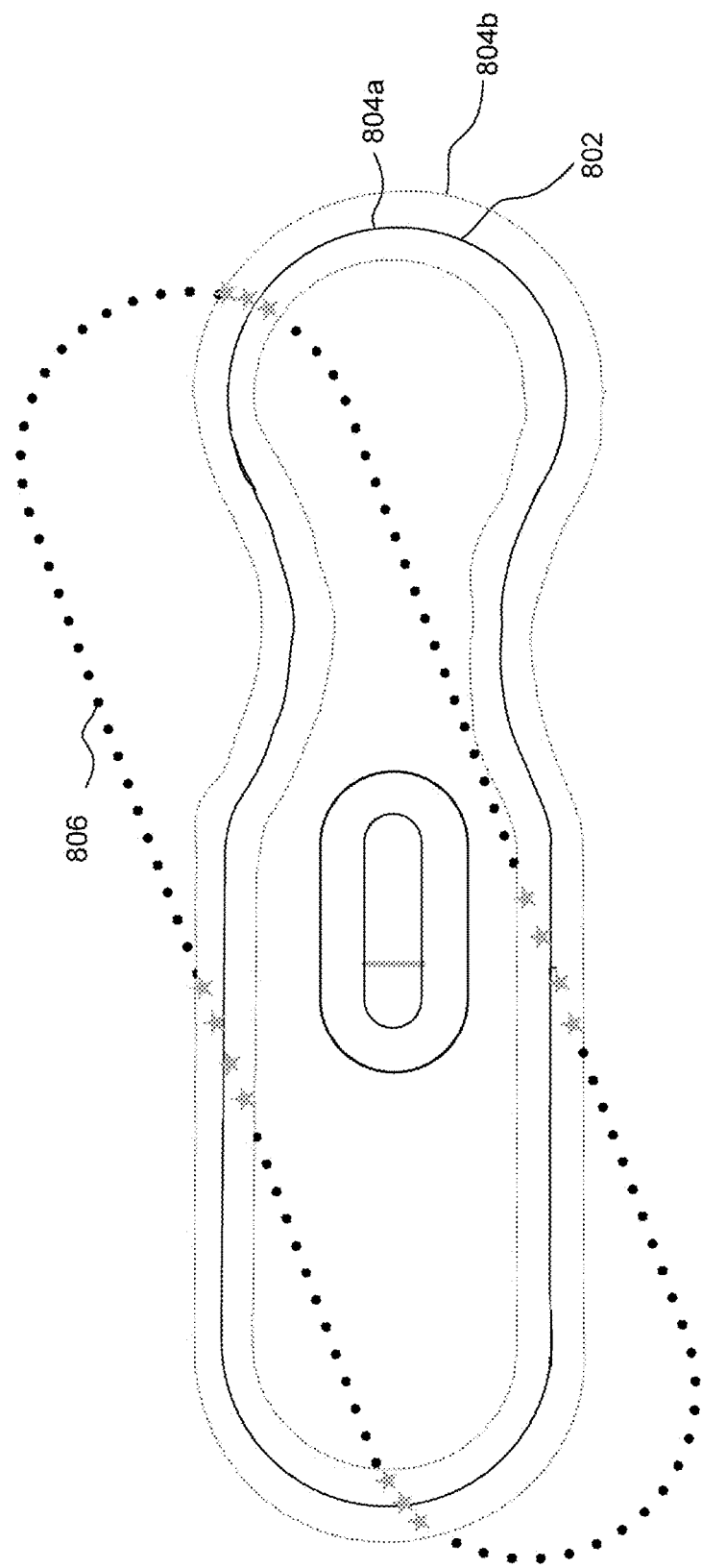
FIG. 8 schematically illustrates an example of a "bad fit" of the shape template to a test structure image object and a distribution of inliers and outliers.

A second approach of determining a second matching condition may be considered with respect to FIG. 8. The shape template 806 is displayed on top of a detected outline of the test structure 802 in a captured image frame. The detected outline of the test structure 802, is shown here as a solid line however, this may correspond to multiple discrete detected edge points that correspond to roughly the shape provided by the outline of the test structure 802. The shape template 806 is shown as comprising uniform multiple circles where the multiple circles may correspond to shape template points, however, the shape template may include points not as uniformly spaced. The shape template 806 may be any shape that roughly corresponds to the shape of the test structure. The dashed lines 804a and 804b form a threshold band around the outline of the test structure 802 captured image. The dashed lines 804a and 804b correspond to points measured at a pre-determined threshold displacement from each of the points on the outline of the test structure 802. If the second displacement for a point on the shape template 806 is measured to be below (or at or below) a pre-determined threshold displacement from a corresponding point on the test structure outline 802, then the point may be labelled an "inlier".

In FIG. 8, the inliers are represented as the stars. Inliers may lie in between the two threshold lines 804a and 804b within a threshold band around the outline of the test structure 802. If the second displacement for a point on the shape template is measured to be above a pre-determined displacement threshold, then the point may be labelled an "outlier". These "outliers" may lie outside the threshold band around the outline of the test structures. In FIG. 8 the outliers are represented as the circles. If the number of points on the shape template labelled as "inliers" is above a pre-determined value, then the mapped shape template may be considered to have a good fit. For example, consider FIG. 8 where the shape template is not very well aligned with the outline of the test structure. Here, there are fewer inliers than there are outliers and this may result in it being determined that the shape template does not conform well enough to the outline of the test structure and there is not a good fit.

Figure 9:
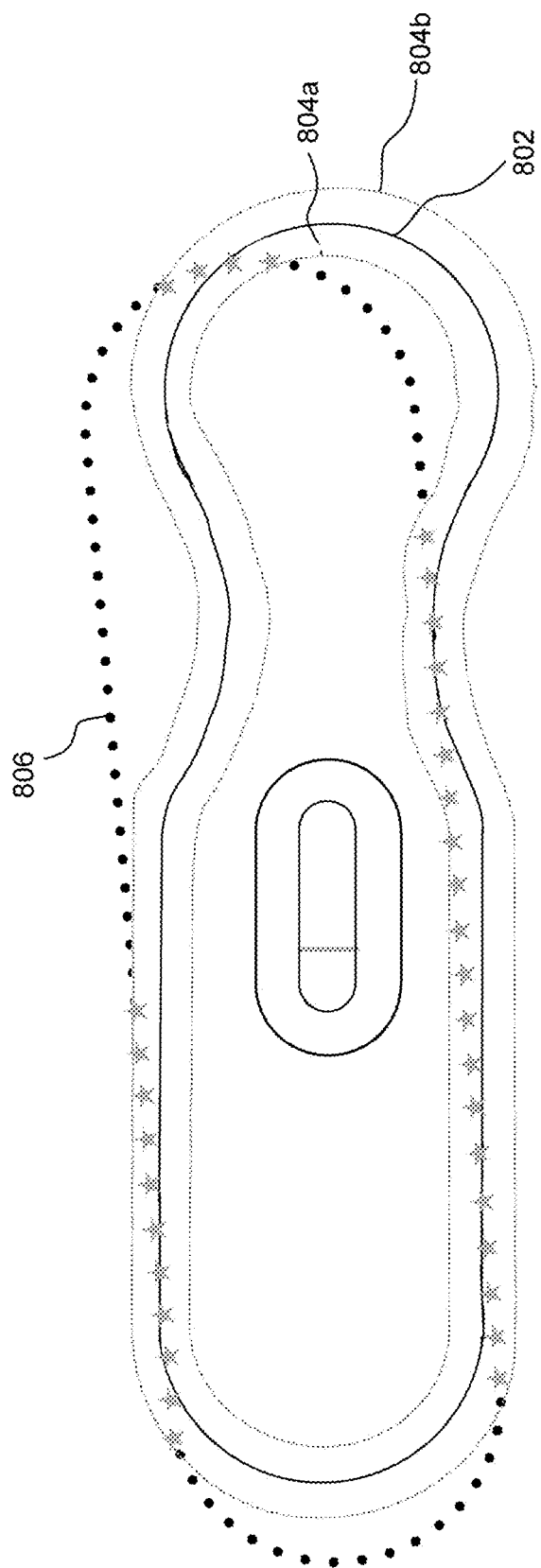
FIG. 9 schematically illustrates an example of a "good fit" of the shape template to the test structure object relative to the FIG. 8 example and a corresponding distribution of inliers and outliers.

By contrast, FIG. 9 demonstrates an example where there may be a good fit relative to the fit illustrated in FIG. 8. In practice, a "good fit" would involve a match between image edges and the shape template but for ease of illustration FIG. 9 shows a relatively better fit than FIG. 8. In the example of FIG. 9, the number of inliers shown by the stars may be more than the number of outliers. Although in these examples the relative number of inlier and outliers has been considered, this may not always be the case. In some scenarios, it may be possible that there may be more outliers than inliers, however the number of inliers is still above the pre-determined value and hence it may still be a good fit. Alternatively, or additionally, significance values of the points may be taken into consideration. When determining the number of inliers, the significance of the inliers may be taken into account when determining a matching condition involving relative numbers of inliers and outliers.

Although in FIG. 8 and FIG. 9, points on a shape template for a given mapping to the image frame have been defined as inliers or outliers based on whether or not they lie within a maximum threshold distance from an edge of the shape template in any direction. In an alternative categorisation, an inlier or outlier status may depend on an alignment between a direction associated with a shape template point and a direction associated with a closest detected edge. For example, in the example of FIG. 5, in the absence of the object edge 510 being in close proximity to the shape point 502, the undesired point 512 may be the point for which a displacement is defined. Although the magnitude of the distance between the point 502 and the point 512 maybe small and below a threshold value that would potentially qualify the shape point 502 as an inlier, a misalignment of the normal vector 504 to the shape template edge relative to a normal 514 of the detected object edge may cause the shape point 502 to be categorised as an outlier.

Thus an inlier or outlier status may depend on at least one of a displacement between a shape template point and a closest edge point being less than a maximum value and an alignment of the following two vectors being sufficiently close: (i) a normal to the shape template edge proximal to the shape template point; and (ii) a normal to a detected closest edge. For example, the vector 504 and the vector 514 diverge too much for the shape point 502 to be categorised as an inlier when mapped to the image point 512, so the shape point 502 is categorised as an outlier in some examples.

Second Matching Condition: Approach Three

According to a third approach, the same method is performed in the second approach in which a number of points on the shape template are labelled as "inliers". However, in this case a classifier algorithm may be used to determine if there is good fit based on a distribution pattern of the inliers. The classifier may be a "forest classifier" comprising at least one decision tree. A decision tree may be a decision graph in the form of a tree which may provide an outcome given a certain series of queries.

The classifier may be a machine learning algorithm. The classifier may comprise at least one decision tree which may based on a machine learning library. The machine learning library may be for the programming language Python, or any suitable computer programming language. The classifier may have been built using a statistically significant number of image data sets which correspond to a variety of different output possibilities of positioning of the shape template on the image frame with respect to the image of the test structure. Using the machine learning, the classifier may be able to determine from the previous data sets, what distribution of "inliers" corresponds to a good fit of the mapped shape template. The decision tree may query the distribution of the "inliers". The classifier may implicitly attribute a different level of significance to each displacement.

The output of the classifier may include an estimate of the probability that the input to the classifier belongs to any particular class. The mean probability of all out the outcome probabilities of the at least one decision tree in the forest classifier may be used to determine if the shape template is a good fit or not. Based on the outcome probabilities the classifier may decide if the mapped shape template is a good fit, a close fit or not a fit at all.

If none of the above three second matching condition approaches are satisfied and a good fit of the mapped shape template is not found, the method may return to element 202 of the FIG. 2 flow chart, whereupon a further image may be captured and the entire method up to this point may be repeated. Only one of the three second matching condition approaches need be applied in any given embodiment, although two or three approaches could be used in a given embodiment.

If any of the above three examples, if the second matching condition is in fact found to be satisfied, then a good fit is determined at process element 212 and it may be verified that the given mapping satisfies a second matching condition based on second displacements of one or more edges identified in the image frame relative to the shape template. The given mapping may then be considered a verified mapping between the captured a test structure and the shape template and a verified image is identified corresponding to the verified mapping. In the event of a good fit at element 212, the process may continue to element 214 in which a target measurement region is analysed.

At process element 214 a target measurement region is analysed. A target measurement region in the image frame may be identified corresponding to the target measurement region on the test structure. The shape template provides a reference to identify the target measurement region on the test structure. The identified target measurement region of the image frame with a good fit shape template may be analysed to determine an Analysis Result$_N$ 258. The target measurement region analysis may perform at least one of: measuring a colour or hue of one or more pixels in the target measurement region; measuring the luminosity of one or more pixels in the target measurement region; determining the presence of at least one of a pattern or line the target measurement region or comparing the target measurement region to reference images that may be stored in a memory.

Figure 15:
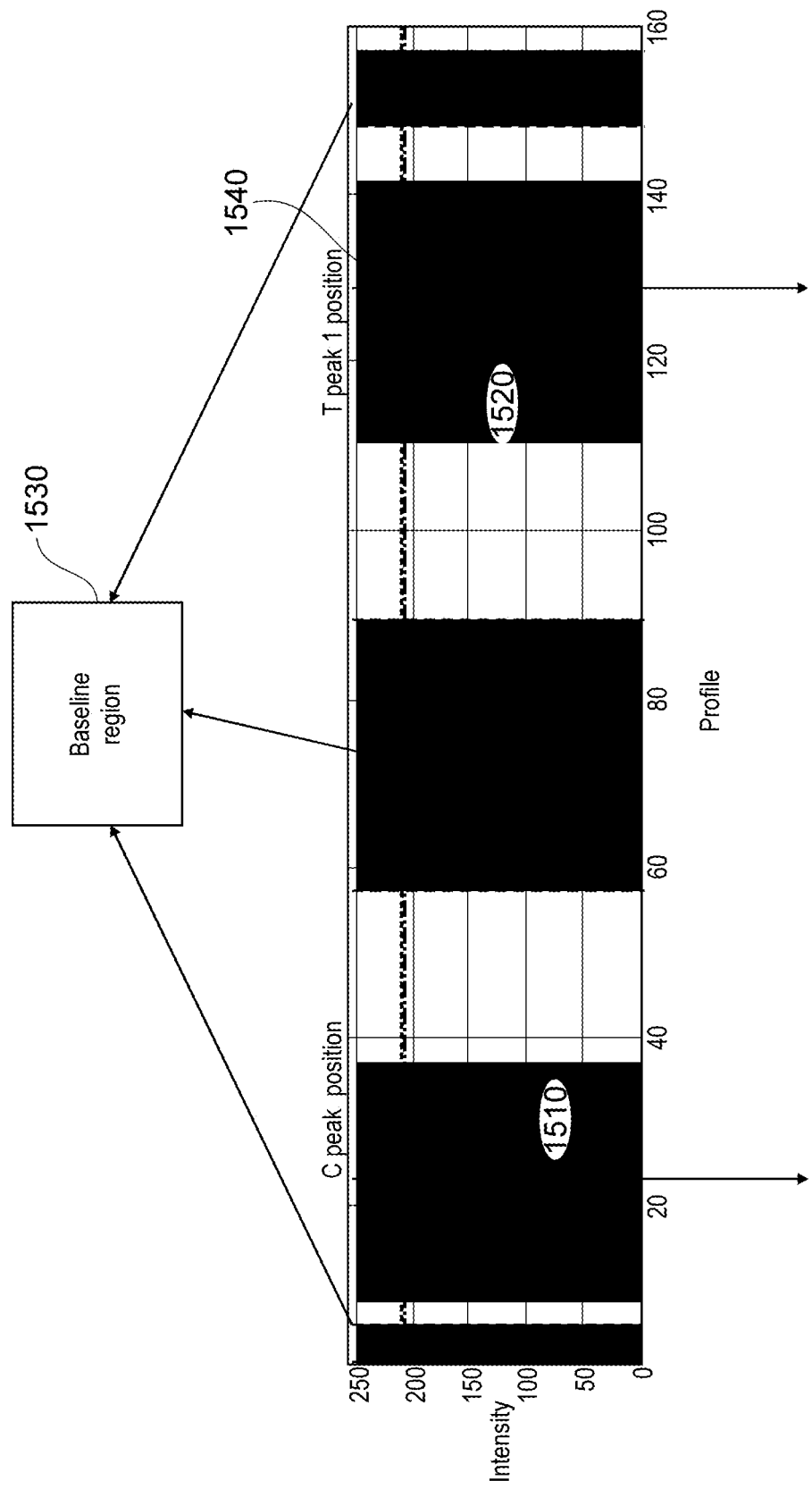
FIG. 15 schematically illustrates an example analysis of a target measurement region of a test structure.

The target measurement region may be analysed by correcting the colour or changing the colour of the region to greyscale. Pixels within the target measurement region may be averaged, for example columns in a rectangular region may be summed to provide a line profile. FIG. 15 schematically illustrates an example analysis of a target measurement region of a test structure. The target measurement region is illustrated with a scale of intensity on a y axis and position (distance) along an x axis. This example has a first peak position 1510 corresponding to a control region and a second peak position 1520 corresponding to a test measurement region. The first and second peak regions 1510 and 1520 are separated by a baseline region 1530. A baseline 1540 may be fitted to the detected line profile and interpolated or extrapolated to areas of the line profile where peaks may not be expected. The size of the peaks 1510, 1520 may be measured, where the size of the peaks may correspond to at least one of the height or the area between the baseline 1540 and the line profile 1510 or 1520 at that point. The size of the peak may be compared to a known reference signal. The result value may then be determined by comparing the size of the peak to be one of: above or below a reference threshold or to be calculated using a calibration curve. In some examples, a polynomial baseline fitting analysis may be used to analyse the test measurement region. This may involve calculating distances from the baseline 1540 to local minima in the control peak 1510 and the test peak 1520. Height values or ratios between heights may be used to provide an interpretation of the test. For example, a ratio between the second (test) peak 1520 height and the first (control) peak height 1510 may be used as a test measurement.

The user may be notified that an Analysis Result$_N$ 258 has been determined and the user may be notified of the Analysis Result$_N$ 258. The user may be notified by any suitable means for example, by at least one of feedback on a display unit of the mobile device, haptic feedback from the mobile device or a sound from the mobile device. A certainty of the Analysis Result$_N$ 258 or level of confidence in the Analysis Result$_N$ 258 may also be determined and the user may be provided with this uncertainty or confidence level on the display unit of the mobile device 111 or other image capture apparatus. Depending on the level of certainty indicated, the user may acquire one or more further image frames to improve a level of confidence in the determined the Analysis Result$_N$ 258. At element 216 it may be determined if the analysis is completed based on at least one of a user's input, a pre-determined condition or based on the value of the Analysis Result$_N$ 258. If the analysis is not complete, then a further image may be captured and the entire method may be repeated. If the analysis is complete a Test Outcome Value 260 may be determined. If only one image was used the Analysis Result$_N$ 258 may correspond to the test outcome value 260 and may be reported to the user alongside an uncertainty. The Analysis results for at least two analysed image frames may be combined to provide a test outcome value. The average of multiple analysis results for different captured images may be determined to determine a test outcome value 260. The test outcome value 260 may be presented to the user alongside an uncertainty associated with the test outcome value.

Figure 10:
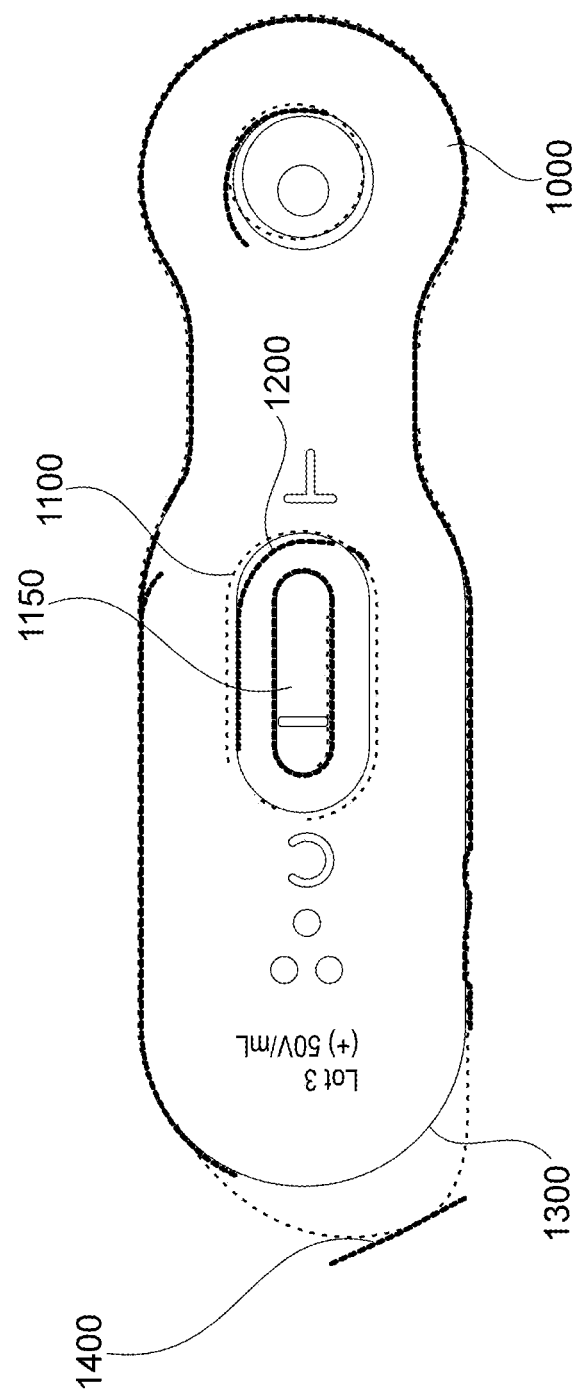
FIG. 10 schematically illustrates an example when the shape template fits to wrongly identified edge points in a captured image frame.
Figure 11:
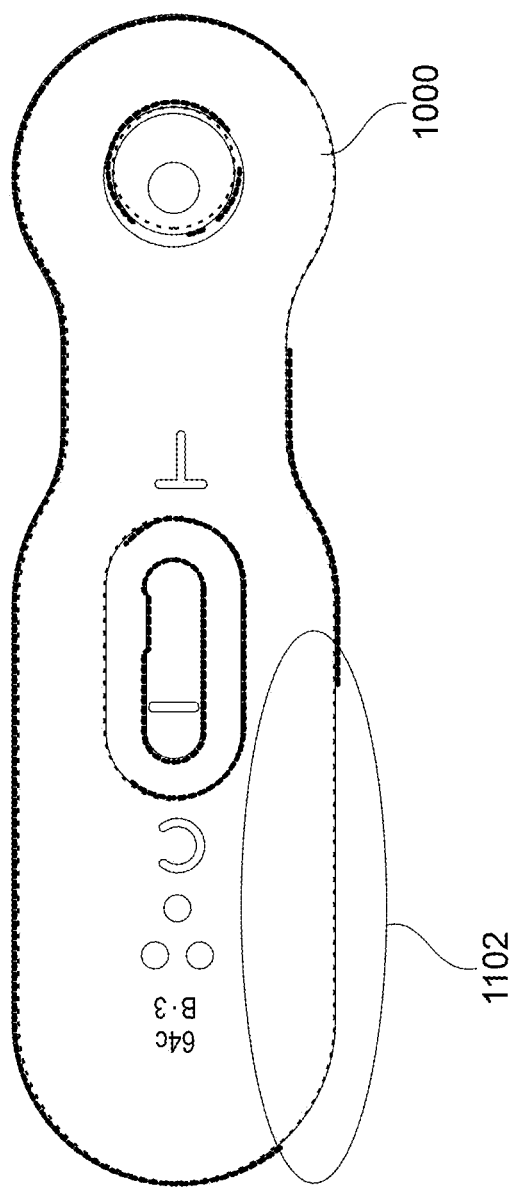
FIG. 11 schematically illustrates an example when the shape template has a "good fit" to the test structure even when edges of the test structure may not be detected due to lighting conditions during image capture of the test structure.
Figure 12:
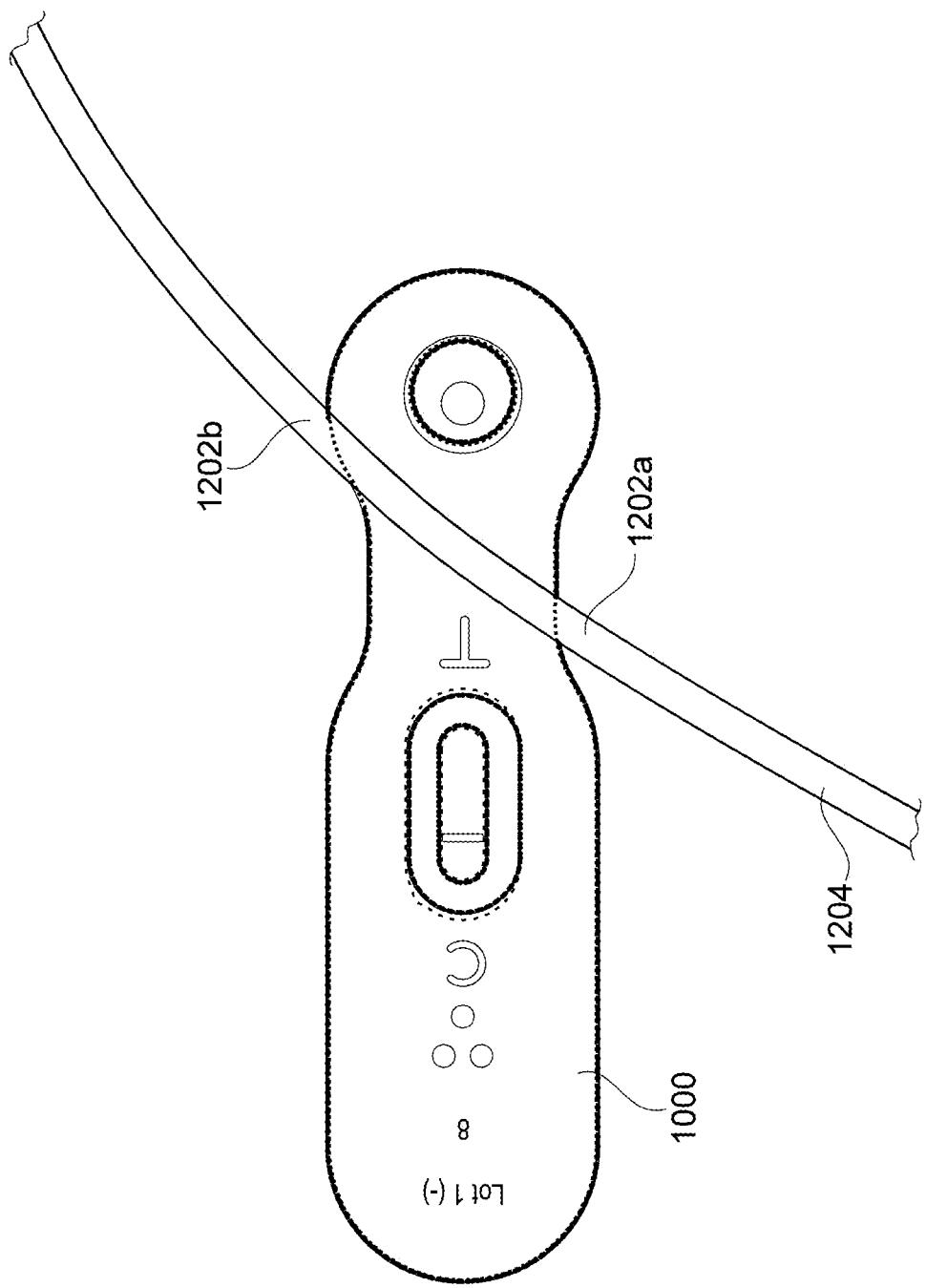
FIG. 12 schematically illustrates an example when the shape template has a "good fit" to the test structure even when edges of the test structure in a captured image are hidden due to an obstructing article that has been overlaid on the physical test structure when the image was captured.

In FIGS. 10, 11 and 12 the shape template is represented by short thinner dashes, such as the dashes close to the label 1400 in FIG. 10 and the detected edges in the image frame are represented by thicker short dashes such as the two discrete groups of thick dashes partially overlying the thinner dashed line labelled 1400. In many places, the thicker dashed line (detected edge regions) and the thinner dashed line (shape template outline) are approximately coincident, but in some portions of the shape template perimiter there are gaps in the detected edge regions.

FIG. 10 schematically illustrates an example of executing an algorithm according to the present technique and shows an example mapping for which the first matching condition is satisfied whereby the mean square of the first displacements is minimised. The mean square of the first displacements is minimised in this case because the shape template points are close to the detected edge points, although the match is not an exact one as can be seen, for example, by slight misalignment of an edge of an oval portion of the shape template in a region 1100 surrounding the test object window 1150 relative to the corresponding edge 1200 detected in the captured image. In this example, alignment of the shape template and the detected image of the test structure is compromised by a printed address appearing in the image behind the test structure 1000. An edge 1300 of the test structure 1000 in the captured image has not been correctly identified by the edge detection algorithm, but instead some of the printed text. i.e. the word "Edinburgh" has been identified as a shape template edge. The shape template has been fitted to the incorrectly identified edges, so the mapping is erroneous in the region 1400. This example shows how a second matching condition may be appropriate to determine if the shape template is a good fit or not to the actual image of the test structure. The example of FIG. 10 may be provided to the machine learning classifier of the third approach described above approach to demonstrate an example of a "bad fit".

Returning to the example of FIG. 7, the shape template has been fitted to the test structure 1000 but the shape template has been inverted. The mean square first displacement between the shape template and the edges detected in the image frame has been minimised, however it is still not a good fit. The example of FIG. 7 would likely satisfy the first matching condition due to the well-fitting edges 704*a*, 704*b* at each end of the test structure, but would be likely to fail any of the second matching conditions. Although the mean square of the first displacement is larger in the FIG. 7 example than in the example in FIG. 10, one of the second matching conditions may provide a closer fit of the shape template to the test structure by preventing verification of the erroneous mapping and triggering an update of the mapping to find an improved fit based on both the first and second matching conditions. Similarly to the FIG. 10 example, the example of FIG. 7 may be provided to the machine learning classifier of approach 3, to demonstrate an example of a "bad fit".

FIG. 11 schematically illustrates an example when not all of the edges of a captured image of the test structure 1000 have been identified by the edge detection algorithm due to bad lighting conditions having made it difficult to distinguish a boundary of the test structure from the background in a region 1102. Particularly in region 1102 it is clear from the lack of the thicker dashes corresponding to the detected edges (as opposed to the more continuous thinner dashed line corresponding to the shape template position), that this edge has not been well detected. Due to the lack of edges a single test based on the proportion of detected points may fail in this example, even although the shape template (thinner dashes line which is more continuous) is a good fit with the test structure. By using the first matching condition it can be determined that the mean square of the first displacements is minimised before the second matching condition is applied. This image may be provided to the machine learning classifier as an example of "good fit" to override the effects of the indistinguishable test structure edge in the region 1102.

FIG. 12 schematically illustrates an example of a mapping defining a transformation of the shape template relative to a captured image frame when an electrical cable 1204 has been placed over the test structure 1000, covering a portion of the test structure 1000. The position of the cable 1204 is such that it obscure short sections of the edges in the regions 1204*a* and 1204*b*. Despite this obstruction, the shape template 1000 has been found, based on the edges that have been detected and mapped to the transformation of the shape template as shown, to have a good fit with the test structure 1000 based on the second matching condition testing based on the distribution of points on the shape template and the pattern that they form. This image may be provided to the machine learning classifier as an image displaying "good fit".

Thus, according to the present technique, a combination of the first matching condition and the second matching condition provide a robustness in identifying an appropriate aping between a shape template and a test structure in a captured image, to variable lighting conditions and certain obstructions of the test structure in the captured image.

Figure 13:
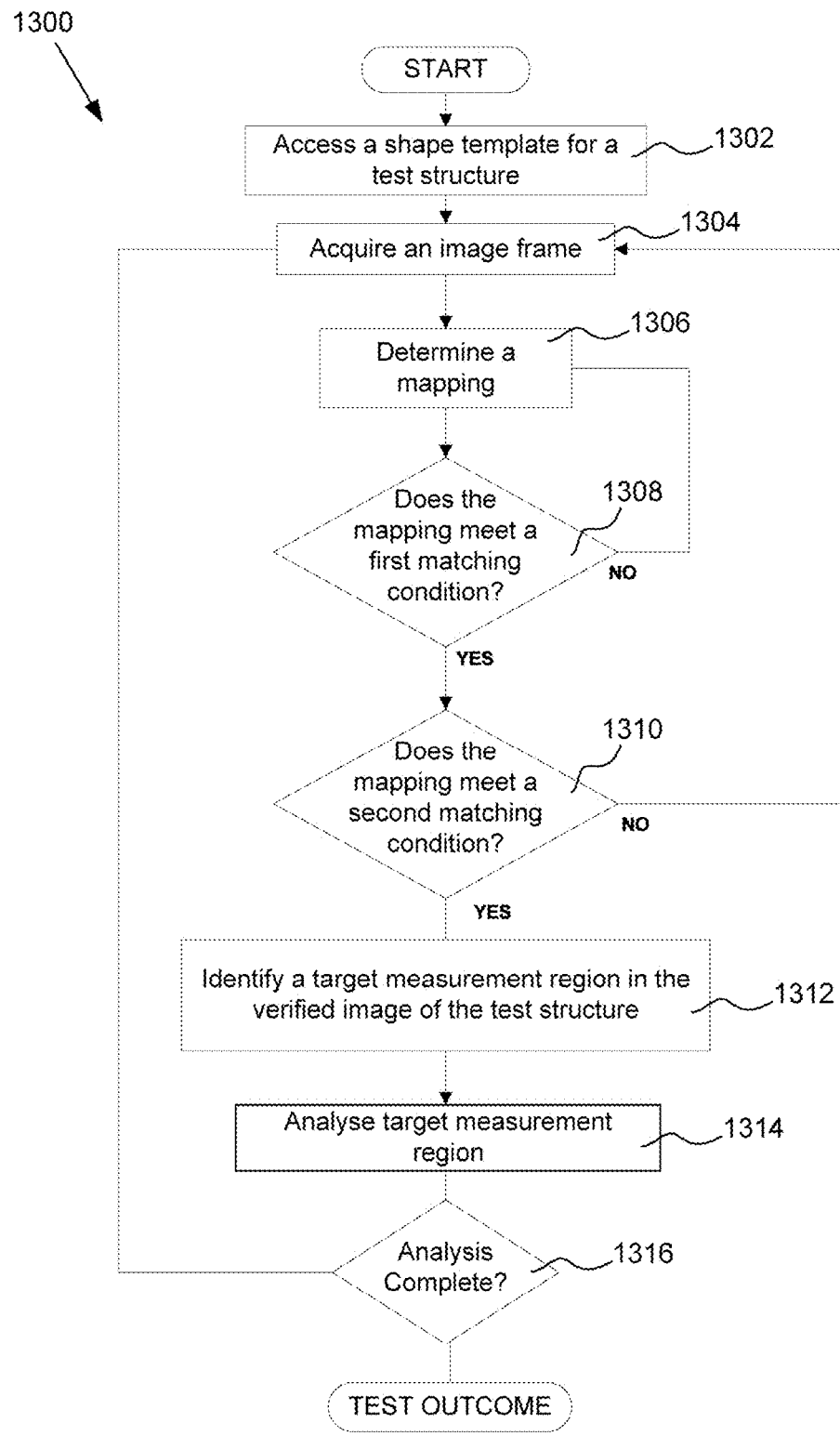
FIG. 13 is a flow chart schematically illustrating an iterative method performed to determine a test outcome value from a test structure.

FIG. 13 schematically illustrates an iterative method performed to determine a test outcome value from a test structure. The FIG. 13 flow chart is a less detailed flow chart that the flow chart of FIG. 2, but describes a similar process.

At element 1302 of FIG. 13, a shape template for a test structure may be accessed from a shape template repository in a memory of the apparatus to determine the test outcome (e.g. a mobile device or alternative image capture apparatus). Alternatively, the shape template may be accessed from an external memory which can be remotely accessible to the mobile device. The shape template corresponds to a test structure as described in relation to FIG. 2.

At element 1304 of FIG. 13, an image frame may be acquired by the mobile device using a camera of the mobile device. Alternatively, the image may be acquired by accessing an image frame stored in a memory on the mobile device or stored in a memory separate from the mobile device which may be remotely accessed. The image frame may be acquired in response to an indication by a user that a test outcome value is requested, for example, via execution of a test outcome determination algorithm according to the present technique.

Next, at element 1306 of FIG. 13, at least one mapping may be determined. The mapping may define a transformation of the shape template on to the acquired image frame (see FIG. 4). The mapping may be based on an initial positioning of the shape template in the image frame. The mapping may include transforming a subset of 2D points on the shape template into the same coordinate frame as the image frame. The mapping may have any of the same properties as associated with the mapping element 208 of FIG. 2. The determining the at least one mapping may depend on at least one of a previously determined mapping or at least one previously acquired image frame. The determining the at least one mapping may depend on the result of an optical flow tracker based on at least one previously acquired image frame and a current image frame. The at least one mapping may be adjusted to at least one of a different position or a different orientation of the test structure in its physical position or to adjust for the position and/or orientation of the image capture device relative to the test structure at the time of the image capture to correct for at least one of rotation, skew, scale or distortion.

At element 1308 of FIG. 13, it is determined if the given mapping of the shape template on the image frame meets a first matching condition. The first matching condition may be based on first displacements of one or more edges identified in the image frame relative to points, directions and edges of the shape template. This first matching condition may be the minimisation algorithm as described with respect to FIG. 2 and element 210. Edges in the image frame may be identified using "Canny Edge Detection" as described in the previous section or any other edge detection algorithm. First displacements may be measured as the shortest distance from each point of a set of points on the mapped shape template to the closest detected edge in the image frame. Alternatively, the first displacements may be the displacement measured from each point of a set of points on the mapped shape template to the closest detected edge along a direction normal to the detected edge as shown in FIG. 5. The measured first displacements may be used in a minimisation algorithm which may be a minimum least-squares fit algorithm for example a Levenberg-Marquardt algorithm. The first matching condition may comprise a least-squares fit of the first displacements. If it is determined that this minimisation algorithm is not satisfied, i.e. the first matching condition is not met, then the method may return to element 1306 to determine a new mapping. This new mapping may be based on one or more previous mappings for which a satisfactory match has been found. If it is determined that this minimisation algorithm is satisfied, i.e. the first matching condition is met, then the method continues to element 1310.

At element 1310 of FIG. 13, it is determined that the given mapping meets a second matching condition and that the mapping may be established as a verified mapping between the shape template and the captured image of a test structure. This also verifies that the captured image is an image useful for the purpose of accurately identifying a target measurement region to determine a test outcome, a "verified image". The second matching condition may be based on second displacements of one or more edges identified in the image frame relative to the shape template. The second displacements may be measured, as described previously, by measuring the distance between at least a subset of points on the shape template and identified edges in the image frame along a normal of the identified edges. Alternatively, or additionally, the second displacements may be measured along a normal to the edge of the shape template. The second matching condition may be considered to be at least one of the three different example approaches described above to determine good fit discussed in the previous section with relation to element 212 of FIG. 2. This may allow an image that meets the second matching condition to be verified as an image with a good fit of the mapping of the shape template to the image of the test structure.

The second matching condition may attribute different significance values to different ones of the second displacements. The second matching condition may comprise determining an inlier or outlier status of at least a subset of the second displacements depending on the significance values. The significance values may be determined by a machine learning algorithm. The second matching condition may be satisfied by determining that the number of second displacements with an inlier status may be above (or at least equal to) an inlier threshold value. Alternatively, or additionally, the second matching condition may comprise a sum of squares of the second displacements. The second matching condition may be considered to be satisfied if a count of a number of points of the shape template may have the second displacement complying with a pre-determined displacement threshold.

At element 1312 of FIG. 13, a target measurement region in the verified image of the test structure may be identified. The target measurement region may correspond to a target measurement region on the test structure. The shape template may provide a reference to identify the target measurement region on the test structure which may aid in the identification of the measurement region on the image.

At element 1314 of FIG. 13, the identified target measurement region may be analysed to determine an analysis result. The target measurement analysis may involve any of the methods described in the previous section with regard to element 214 of FIG. 2. The target measurement region may be analysed by performing at least one of: measuring a colour of one or more pixels in the target measurement region; measuring a luminosity of one or more pixels in the target measurement region; determining the presence of any pattern or line in the target measurement region; and comparing the target measurement region to one or more pre-determined reference images or profiles.

At element 1316 of FIG. 13, based on the value of the analysis result it may be determined if the analysis is complete or not. If the analysis is complete may also be determined based on an uncertainty calculated in the analysis result. If the analysis is determined to be incomplete then the method returns to element 1304 and a new image frame is acquired. The method may then continue until it is determined that analysis is complete. The acquiring of a new image and determining of a new mapping may be based on the previous analysis result. If the analysis is found to be complete then a test outcome value may be determined. This test outcome value may correspond to the analysis result if only one round of the method 1300 was performed. If multiple rounds of the method were performed, there may be multiple analysis results. The test outcome value may be based on multiple analysis results. The user may be notified of the analysis result or the test outcome value. The user may be notified using the display screen of the mobile device or any other suitable mechanism as described in the previous section.

Figure 14:
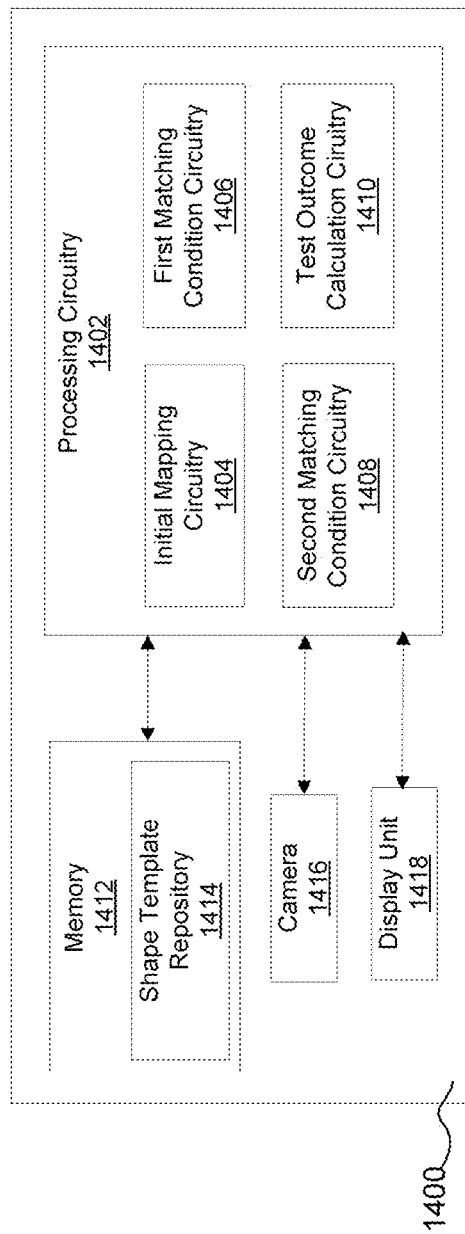
FIG. 14 schematically illustrates a mobile device to determine a test outcome value from a test structure.

FIG. 14 schematically illustrates a block diagram of the mobile device to perform the method to determine a test outcome value from a test structure. The mobile device may be, for example, a mobile phone, a laptop, a tablet, a smart phone or any other suitable portable electronic device. The mobile device 300 may comprise a memory 1412, a camera 141614, a display unit 1418 and processing circuitry 1402. The circuitry units 1404, 1406, 1408 and 1410 may each be implemented on different processors or two or more of the sets of circuitry may be combined. The processing circuitry 1402 may comprise one or more processors. The memory 1412 may be any form of computer readable storage medium. The memory 1412 may include a shape template repository 312. The shape template repository 1414 may store a plurality of shape templates corresponding to a plurality of test structures. The shape templates may be stored in association with the test structure to enable a particular shape template to be accessed easily. The shape template may provide a reference to identify a position of a target measurement region on the test structure. The camera 1416 may be any image capture device which may acquire an image frame either automatically or in response to user input. The camera may acquire an image frame in response to an indication that a test reading is requested. The camera may acquire at least one further image frame in a temporal sequence after an image frame has been identified. Alternatively, the mobile device may not include a camera 1416 and an image frame may be acquired which has been previously captured and may be stored in the memory 1412 or an external memory.

The display unit 1418 may be a display screen, an LCD screen, a touchscreen or any display screen on the mobile device 1400. The display unit 1416 may display a guide on the screen representing the shape template to assist the user in positioning the mobile device 1400 to acquire an image frame. The guide may be in the same shape as the shape template or as the test structure. The guide may be displayed to overlay the image frame on the display unit 1416. The display unit 1416 may display a notification to notify the user that a good fit has been found and that the given mapping satisfies the second matching condition. The display unit 1416 may display may notify the user of the test outcome value. The notification on the display unit 1416 may be a message, an image, a flashing region, a colour change of a portion of the screen or any other similar change to the display to attract the user's attention. The user may be notified that an image is a verified image of the test structure by the mobile device 1400 providing at least one of visual, audio or tactile feedback. The mobile device 1400 may provide audio feedback by emitting a sound or music from the speakers of the mobile device 1400. The mobile device may provide tactile feedback by emitting a vibration.

The processing circuitry 1402 may further include initial mapping circuitry 1404, first matching condition circuitry 1406, second matching condition circuitry 1408 and test outcome calculation circuitry 1410.

The initial mapping circuitry 1404 may determine at least one mapping, each mapping defining a transformation of a shape template relative to the image frame. The initial mapping circuitry may access the shape template from the shape template repository 1414 or from external memory which can be remotely accessed. The mapping may be determined using any of the previously described mechanisms. The initial mapping circuitry 1404 may determine the at least one mapping based on a previously acquired image frame.

The first matching condition circuitry 1406 may determine a given mapping based on a first matching condition. The first matching condition may be based on first displacements of one or more edges identified in the image frame. The first displacements may be measured as described in the previous section. The first matching condition may comprise a least-square fit algorithm using the determined first displacements.

The second matching condition circuitry 1406 may be to verify that the given mapping satisfies a second, different matching condition based on second displacements of one or more edges identified in the image frame relative to the shape template to establish a verified image of a test structure.

The test outcome calculation circuitry 1408 may identify, in a verified image of the test structure 9 corresponding to a verified mapping), a target measurement region corresponding to the target measurement region on the test structure and may analyse the target measurement region of the conforming image frame to determine a test outcome value.

The test outcome calculation circuitry 1408 may perform at least one of measuring a colour of at least one of a plurality of pixels in the target measurement region, measuring a luminosity of at least one of a plurality of pixels in the target measurement region, determining the presence of at least one of a pattern or line in the target measurement region based on the measured at least one of the colour or the luminosity of the at least one of the plurality of pixels in the target measurement region and comparing the target measurement region to one or more pre-determined reference images or profiles stored in the memory 1412. The processing circuitry 1402 may further comprise edge detection circuitry. The edge detection circuitry may determine a plurality of edges in the image frame. The plurality of edges may be determined using an edge detection algorithm as described in the previous section.

The approach according to the present technique is a top-down rather than a bottom-up approach to identifying a shape template and a measurement region of an image of a test structure in a captured image frame to analyse to determine a test outcome. The top-down approach is more computationally efficient and is more reliable in determining a target measurement region of an acquired image frame.

The top-down approach according to embodiments described herein uses a shape template corresponding to a given test structure and determines if is there evidence in an image frame to support the presence of this shape.

The use of a shape template is particularly efficient to identify an object in multiple consecutive images where the object does not move substantially from one image to the next. Implementation of a shape template based technique for test structure identification. For example, the shape template may be difficult to map to the image when not all of the edges of an image object are visible in an image due to lighting conditions and occlusions of parts of the image object. Furthermore, the image may contain edges that are not part of the image object. However, the use of the first and second matching conditions implemented by embodiments to identify a mapping between the shape template and an image alleviate the difficulties that may be associated with the process.

Key differences of the examples of test structure according to the present technique relative to a bottom up approach include:

Whereas known edge detection has no explicit model of the shape, template matching has an explicit model of the object to be analysed in form of the shape template.

Known edge detection is bottom-up in that it starts with the image and then then forms increasingly abstracted data (edges then lines). The structure within the abstracted data is then sought.

By way of contrast, the template matching according to the present technique is top-down. It starts with a model (the shape template) and then evidence for the model is sought in the image data.

Known edge detection iterates through the combinations of features (i.e., each iteration considers a different combination of features). By way of contrast, template matching iterates through a parameter space of the shape template such that each iteration considers different positions and orientations of the shape template relative to the image frame, that is, different mappings. Mappings are evaluated and verifies according to a first matching condition and a second, different, matching condition.

The approach according to the present technique may allow a test structure to be automatically read using a camera. Lateral flow may be used to track the test structure in an image sequence. This may have the advantage over a human reader of accuracy, consistency of results and allowing the result to be automatically recorded. There may be no requirement in the present technique for any other apparatus other than a mobile device which may reduce the cost of analysing test results automatically and make the system more convenient to use than known methods where additional apparatus may be required. The present technique may result in there being no requirement for apparatus to fix the test structure relative to the camera or the for lighting to be controlled, as would be the case for previously known systems. The present technique may allow the test structure to be tracked in real time through the use of multiple image frames and the analysis to determine a test outcome value may be based on the image frames including the automatic tracking.

Where functional units have been described as circuitry, the circuitry may be general purpose processor circuitry configured by program code to perform specified processing functions. The circuitry may also be configured by modification to the processing hardware. Configuration of the circuitry to perform a specified function may be entirely in hardware, entirely in software or using a combination of hardware modification and software execution. Program instructions may be used to configure logic gates of general purpose or special-purpose processor circuitry to perform a processing function.

Circuitry may be implemented, for example, as a hardware circuit comprising custom Very Large Scale Integrated, VLSI, circuits or gate arrays, off-the-shelf semiconductors such as logic chips, transistors, or other discrete components. Circuitry may also be implemented in programmable hardware devices such as field programmable gate arrays, FPGA, programmable array logic, programmable logic devices, A System on Chip, SoC, or the like.

Machine readable program instructions may be provided on a transitory medium such as a transmission medium or on a non-transitory medium such as a storage medium. Such machine readable instructions (computer program code) may be implemented in a high level procedural or object oriented programming language. However, the program(s) may be implemented in assembly or machine language, if desired. In any case, the language may be a compiled or interpreted language, and combined with hardware implementations. Program instructions may be executed on a single processor or on two or more processors in a distributed manner.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C).

EXAMPLES

The following examples pertain to further embodiments.
1. Machine readable instructions stored on a machine readable medium, the machine readable instructions upon execution to cause processing circuitry to:
    access a shape template for a test structure;
    acquire an image frame in response to an indication by a user that a test result reading is requested;
    determine a mapping, the mapping defining a transformation of the shape template relative to the image frame;
    determine if the mapping satisfies a first matching condition based on first displacements of one or more edges identified in the image frame relative to the shape template;
    verify, when the mapping does satisfy the first matching condition that the mapping also satisfies a second, different matching condition based on second displacements of one or more edges identified in the image frame relative to the shape template, to establish a verified image of the test structure when the second matching condition is satisfied;
    identify, in the verified image of the test structure a target measurement region; and
    determine a test outcome value by analysis of the target measurement region.
2. Machine readable instructions as in example 1 or any other example described herein, wherein the mapping comprises a homography to transform a point of the shape template in a shape template coordinate frame to image pixel coordinates in the image frame representing an estimated position of a corresponding point of the test structure.
3. Machine readable instructions as in example 1 or example 2 or any other example described herein, wherein the determining the mapping comprises iteratively updating the mapping for the image frame when the mapping does not satisfy the first matching condition until the first matching condition is satisfied, before progressing to the image verification based on the second matching condition.
4. Machine readable instructions as in any one of examples 1 to 3 or any other example described herein, wherein the determining the mapping depends on at least one previously determined mapping for the same test structure.
5. Machine readable instructions as in any one of examples 1 to 4 or any other example described herein, wherein the determining the mapping depends on a verified mapping for at least one previously acquired image frame including the test structure.
6. Machine readable instructions as in any one of examples 1 to 5 or any other example described herein, wherein the determining the mapping comprises using an optical flow tracker based on the at least one previously acquired image to determine the mapping for the image frame.
7. Machine readable instructions as in any one of the preceding examples or any other example described herein, comprising iteratively triggering capture of a new image frame to replace the image frame when the second matching condition is not satisfied and repeating each of the mapping determination, the determination of satisfaction of the first mapping condition and the verification of satisfaction of the second matching condition for each new image frame until a verified image is identified.
8. Machine readable instructions as in any of the preceding examples or any other example described herein, the machine readable instructions upon execution by processing circuitry to:
identify the one or more edges in the image frame using an edge detection algorithm prior to performing the determination of the mapping.
9. Machine readable instructions as in any one of the preceding examples or any other example described herein, wherein the shape template comprises a set of two-dimensional points representing at least a partial outline of edges of the test structure and the target measurement region.
10. Machine readable instructions as in any one of the preceding examples or any other example described herein, wherein the first matching condition comprises identifying a minimum of the sum of the squares of the first displacements corresponding to a fit between the shape template and the one or more edges identified in the image frame.
11. Machine readable instructions as in any one of the preceding examples or any other example described herein, wherein the second matching condition comprises comparing the sum of squares of the second displacements with a threshold value.
12. Machine readable instructions as in any one of the preceding examples or any other example described herein, wherein the second matching condition attributes different significance values to different ones of the second displacements when determining the second matching condition.
13. Machine readable instructions as in example 12 or any other example described herein, wherein the significance values are assigned using results of a machine learning algorithm.
14. Machine readable instructions as in any one of the preceding examples or any other example described herein, wherein the second matching condition comprises determining an inlier status of at least a subset of the second displacements wherein an assignment of inlier status depends on a magnitude of the second displacement.
15. Machine readable instructions as in example 14 or any other example described herein, wherein satisfying the second matching condition comprises performing a count of a number of the second displacements having the inlier status.
16. Machine readable instructions as in example 15 or any other example described herein, wherein satisfying the second matching condition comprises determining that the count of the number of second displacements having the inlier status is greater than a threshold value.
17. Machine readable instructions as in any one of the preceding examples or any other example described herein, wherein the second matching condition is determined by output of a classifier algorithm.
18. Machine readable instructions as in example 17 or any other example described herein, wherein at least a subset of the second displacements are used as an input to the classifier algorithm.
19. Machine readable instructions as in example 18 or any other example described herein, wherein at least a function of a subset of the second displacements are used as the input to the classifier algorithm.
20. Machine readable instructions as in example 17 or example 18 or any other example described herein, wherein the classifier is trained with at least a subset of the second displacements determined from a plurality of training images, wherein the training images have a plurality of points labelled as inliers.
21. Machine readable instructions as in example 17 or any other example described herein, wherein satisfying the second matching condition comprises performing a count of a number of the second displacements having an inlier status, the inlier status depending on a magnitude of the second displacement and wherein at least a subset of the second displacements having the inlier status are used as the input to the classifier
22. Machine readable instructions as in example 17 or any other example described herein, wherein the classifier algorithm is trained using information comprising at least a subset of inlier statuses determined from a plurality of labeled training images, the inlier status depending on a magnitude of the second displacement.
23. Machine readable instructions as in any of the preceding examples or any other example described herein, wherein a second displacement is measured by matching a point on the shape template and a corresponding point of the edges identified in the image frame based on at least one of a normal to an edge of the shape template or a normal to the edge in the image frame and measuring a distance between the matched points as a second displacement value.
24. Machine readable instructions as in in any of the preceding examples or any other example described herein, further comprising instructions to cause processing circuitry to statistically combine two or more test outcome values for at least two acquired image frames to provide a consolidated test result.
25. Machine readable instructions as in any one of examples 1 to 24 or any other example described herein, wherein analysis of the target measurement region comprises machine readable instructions upon execution by processing circuitry to perform at least one of:

measure a colour of one or more pixels in the target measurement region;

measure a luminosity of one or more pixels in the target measurement region;

determine the presence of any pattern or line in the target measurement region; and compare the target measurement region to one or more pre-determined reference images or profiles.

26. A mobile device comprising:

a memory to store a shape templates corresponding to a test structure, the shape template to provide a reference to identify a position of a target measurement region on the test structure;

a camera to acquire an image frame in response to an indication that a test outcome value is requested;

mapping circuitry to determine a mapping, the mapping defining a transformation of the shape template relative to the image frame;

first matching condition circuitry to determine if the mapping satisfies a first matching condition based on first displacements of one or more edges identified in the image frame relative to the shape template;

second matching condition circuitry to verify when the mapping does satisfy the first mapping condition that it also satisfies a second, different matching condition based on second displacements of one or more edges identified in the image frame relative to the shape template to establish a verified image of a test structure when the second matching condition is satisfied; and test outcome calculation circuitry to identify, in the verified image of the test structure, a target measurement region corresponding to the target measurement region on the test structure and to analyse the target measurement region of the verified image frame to determine a test outcome value.

27. Mobile device as in as in example 26 or any other example described herein, wherein the mapping circuitry is arranged to iteratively update the mapping for the image frame when the mapping does not satisfy the first matching condition until the first matching condition is satisfied, before progressing to the image verification based on the second matching condition.

28. Mobile device as in example 26 or example 27 or any other example described herein, wherein the mapping circuitry determines the mapping depending on at least one previously determined mapping for the same test structure.

29. Mobile device as in any one of examples 26 to 28 or any other example described herein, wherein the mapping determination circuitry uses an optical flow tracker based on the at least one previously acquired image to predict the mapping for the image frame.

30. Mobile device as in any one of examples 26 to 29 or any other example described herein, comprising processing circuitry to iteratively trigger capture of a new image frame to replace the image frame when the second matching condition is not satisfied and repeating each of the mapping determination, the determination of satisfaction of the first mapping condition and the verification of satisfaction of the second matching condition for each new image frame until a verified image is identified.

31. The mobile device of any one of examples 26 to 30 or any other example described herein, wherein the second matching condition circuitry is to verify that that the given mapping satisfies a second, different matching condition, wherein the second matching condition comprises determining an inlier status of at least a subset of the second displacements, the inlier status corresponding to being within a maximum displacement magnitude of the shape template.

32. The mobile device of example 31 or any other example described herein, wherein the second matching condition circuitry comprises a machine learning algorithm to determine an inlier status of at least a subset of the second displacements to determine if the second matching condition is satisfied.

33. The mobile device as in any one of examples 26 to 32 or any other example described herein, wherein the mapping circuitry is to determine the mapping of the image frame based on at least one previously acquired image frame.

34. The mobile device as in any one of examples 26 to 33 or any other example described herein, wherein the test outcome calculation circuitry is to at least one of:

measure a colour of at least one of a plurality of pixels in the target measurement region;

measure a luminosity of at least one of a plurality of pixels in the target measurement region;

determine the presence of at least one of a pattern or line in the target measurement region based on the measured at least one of the colour or the luminosity of the at least one of the plurality of pixels in the target measurement; or compare the target measurement region to one or more pre-determined reference images or profiles stored in the memory.

35. The mobile device as in any one of examples 26 to 34 or any other example described herein, further comprising:

a display unit to display a visual guide on the display representing the shape template to assist the user in positioning a camera device to acquire an image frame and to notify the user of the test value outcome.

36. A method to determine a test outcome value by analyzing a captured image, the method comprising:

accessing a shape template for a test structure;

acquiring an image frame in response to an indication that a test result reading is requested;

determining a mapping, the mapping defining a transformation of the shape template relative to the image frame;

determining if the mapping satisfies a first matching condition based on first displacements of one or more edges identified in the image frame relative to the shape template;

verifying, if the mapping does satisfy the first matching condition if the mapping satisfies a second, different matching condition based on second displacements of one or more edges identified in the image frame relative to the shape template to establish a verified image of a test structure when the second matching condition is satisfied;

identifying, in the verified image of the test structure a target measurement region; and determining a test outcome value by analysis of the target measurement region.

37. The method of example 36 or any other example described herein, wherein the first displacements correspond to a first set of shape template points and the second displacements correspond to a second set of shape template points.

38. The method of example 37 or any other example described herein, wherein the first set of shape template points and the second set of shape template points are the same set of points.

39. Machine readable instructions of any one of examples 1 to 25 or the mobile device of any one of examples 26 to 35 or the method of any one of examples 36 to 38, wherein the analysis of the target measurement region results in detection of the presence or absence of a chemical agent or a biological agent.

The invention claimed is:

1. Machine readable instructions stored on a non-tangible machine readable medium, the machine readable instructions upon execution to cause processing circuitry to:
   access a shape template for a test structure;
   acquire an image frame in response to an indication by a user that a test result reading is requested;
   determine a mapping, the mapping defining a transformation of the shape template relative to the image frame;
   determine if the mapping satisfies a first matching condition based on first displacements of one or more edges identified in the image frame relative to the shape template;
   verify, when the mapping does satisfy the first matching condition that the mapping also satisfies a second, different matching condition based on second displacements of one or more edges identified in the image frame relative to the shape template, to establish a verified image of the test structure when the second matching condition is satisfied;
   wherein the second matching condition is determined by output of a classifier algorithm, and wherein at least a subset of the second displacements are used as an input to the classifier algorithm
   identify, in the verified image of the test structure a target measurement region; and
   determine a test outcome value by analysis of the target measurement region.

2. Machine readable instructions as claimed in claim 1, wherein the mapping comprises a homography to transform a point of the shape template in a shape template coordinate frame to image pixel coordinates in the image frame representing an estimated position of a corresponding point of the test structure.

3. Machine readable instructions as claimed in claim 1, wherein the determining the mapping comprises iteratively updating the mapping for the image frame when the mapping does not satisfy the first matching condition until the first matching condition is satisfied, before progressing to the image verification based on the second matching condition.

4. Machine readable instructions as claimed in claim 1, wherein the determining the mapping depends on a verified mapping for at least one previously acquired image frame including the test structure and wherein optionally am optical flow tracker is used to determine the mapping.

5. Machine readable instructions as claimed in claim 1, comprising iteratively triggering capture of a new image frame to replace the image frame when the second matching condition is not satisfied and repeating each of the mapping determination, the determination of satisfaction of the first mapping condition and the verification of satisfaction of the second matching condition for each new image frame until a verified image is identified.

6. Machine readable instructions as claimed in claim 1, wherein the first matching condition comprises identifying a minimum of the sum of the squares of the first displacements corresponding to a fit between the shape template and the one or more edges identified in the image frame.

7. Machine readable instructions as claimed in claim 1, wherein the second matching condition attributes different significance values to different ones of the second displacements when determining the second matching condition and wherein optionally the significance values are assigned using results of a machine learning algorithm.

8. Machine readable instructions as claimed in claim 1, wherein at least a function of a subset of the second displacements are used as the input to the classifier algorithm.

9. Machine readable instructions as claimed in claim 1, wherein the classifier is trained with at least a subset of the second displacements determined from a plurality of training images, wherein the training images have a plurality of points labelled as inliers.

10. Machine readable instructions as claimed in claim 1, further comprising instructions to cause processing circuitry to statistically combine two or more test outcome values for at least two acquired image frames to provide a consolidated test result.

11. A mobile device comprising:
    a memory to store a shape templates corresponding to a test structure, the shape template to provide a reference to identify a position of a target measurement region on the test structure;
    a camera to acquire an image frame in response to an indication that a test outcome value is requested;
    mapping circuitry to determine a mapping, the mapping defining a transformation of the shape template relative to the image frame;
    first matching condition circuitry to determine if the mapping satisfies a first matching condition based on first displacements of one or more edges identified in the image frame relative to the shape template;
    a classifier to determine a second matching condition, wherein at least a subset of the second displacements of one or more edges identified in the image frame relative to the shape template are used as an input to the classifier algorithm;
    second matching condition circuitry to verify when the mapping does satisfy the first matching condition that it also satisfies second, different matching condition based on the second displacements of one or more edges identified in the image frame relative to the shape template to establish a verified image of a test structure when the second matching condition is satisfied; and
    test outcome calculation circuitry to identify, in the verified image of the test structure, a target measurement region corresponding to the target measurement region on the test structure and to analyse the target measurement region of the verified image frame to determine a test outcome value.

12. Mobile device as claimed in as claimed in claim 11, wherein the mapping circuitry is arranged to iteratively update the mapping for the image frame when the mapping does not satisfy the first matching condition until the first matching condition is satisfied, before progressing to the image verification based on the second matching condition.

13. Mobile device as claimed in claim 11, wherein the mapping circuitry determines the mapping depending on at least one previously determined mapping for the same test structure.

14. Mobile device as claimed in claim 11, wherein the mapping determination circuitry uses an optical flow tracker based on the at least one previously acquired image to predict the mapping for the image frame.

15. Mobile device as claimed in claim 11, comprising processing circuitry to iteratively trigger capture of a new image frame to replace the image frame when the second matching condition is not satisfied and repeating each of the mapping determination, the determination of satisfaction of the first mapping condition and the verification of satisfaction of the second matching condition for each new image frame until a verified image is identified.

16. The mobile device as claimed in claim 11, wherein the mapping circuitry is to determine the mapping of the image frame based on at least one previously acquired image frame.

17. A method to determine a test outcome value by analyzing a captured image, the method comprising:
    accessing a shape template for a test structure;
    acquiring an image frame in response to an indication that a test result reading is requested;
    determining a mapping, the mapping defining a transformation of the shape template relative to the image frame;
    determining if the mapping satisfies a first matching condition based on first displacements of one or more edges identified in the image frame relative to the shape template;
    verifying, if the mapping does satisfy the first matching condition if the mapping satisfies a second, different matching condition based on second displacements of one or more edges identified in the image frame relative to the shape template to establish a verified image of a test structure when the second matching condition is satisfied;
    wherein the second matching condition is determined by output of a classifier algorithm, and wherein at least a subset of the second displacements are used as an input to the classifier algorithm;
    identifying, in the verified image of the test structure a target measurement region; and
    determining a test outcome value by analysis of the target measurement region.

18. Machine readable instructions of claim 1, wherein the analysis of the target measurement region results in detection of the presence or absence of a chemical agent or a biological agent.

* * * * *